United States Patent
Blumel et al.

(10) Patent No.: US 12,288,128 B2
(45) Date of Patent: Apr. 29, 2025

(54) DEMODULATION AND SMOOTHING OF AMPLITUDE, FREQUENCY, AND PHASE MODULATED PULSES FOR OPTIMAL IMPLEMENTATION OF ENTANGLING GATES IN ION TRAP QUANTUM COMPUTERS

(71) Applicant: IONQ, INC., College Park, MD (US)

(72) Inventors: Reinhold Blumel, Middletown, CT (US); Nikodem Grzesiak, College Park, MD (US); Yunseong Nam, North Bethesda, MD (US)

(73) Assignee: IONQ, INC., College Park, MD (US)

( * ) Notice: Subject to any disclaimer, the term of this patent is extended or adjusted under 35 U.S.C. 154(b) by 896 days.

(21) Appl. No.: 17/477,107

(22) Filed: Sep. 16, 2021

(65) Prior Publication Data

US 2022/0101166 A1  Mar. 31, 2022

Related U.S. Application Data

(60) Provisional application No. 63/083,714, filed on Sep. 25, 2020.

(51) Int. Cl.
  *G06N 10/00* (2022.01)
  *G06E 1/02* (2006.01)
  *G06F 1/03* (2006.01)

(52) U.S. Cl.
  CPC ............ *G06N 10/00* (2019.01); *G06E 1/02* (2013.01); *G06F 1/0335* (2013.01)

(58) Field of Classification Search
  CPC .......... G06N 10/00; G06N 10/40; G06E 1/02; G06F 1/0335; G06F 1/32
  See application file for complete search history.

(56) References Cited

U.S. PATENT DOCUMENTS

| | | | |
|---|---|---|---|
| 2005/0259856 A1* | 11/2005 | Dehmeshki | G06T 7/64 382/131 |
| 2013/0295682 A1* | 11/2013 | Vanoni | G01N 21/75 436/164 |
| 2014/0249755 A1* | 9/2014 | Hoeber | G01V 1/366 702/14 |
| 2020/0218848 A1* | 7/2020 | Martiel | G06F 30/392 |
| 2021/0241847 A1* | 8/2021 | Cottier | G16C 20/10 |

OTHER PUBLICATIONS

Bruzewicz et al, "Trapped-Ion Quantum Computing: Progress and Challenges", May 29, 2019 (Year: 2019).*

(Continued)

*Primary Examiner* — Farley Abad
(74) *Attorney, Agent, or Firm* — Patterson + Sheridan, LLP

(57) ABSTRACT

Embodiments described herein are generally related to a method and a system for constructing and delivering a pulse to perform an entangling gate operation between two trapped ions during a quantum computation, and more specifically, to a method of demodulating and spline interpolating a pulse that can be practically implemented in the system while increasing the fidelity of the entangling gate operation, or the probability that at least two ions are in the intended qubit state(s) after performing the entangling gate operation between the two ions.

20 Claims, 10 Drawing Sheets

(56) References Cited

OTHER PUBLICATIONS

E. Bedrosian, A Product Theorem for Hilbert Transforms, Memorandum RM-3439-PR, United States Airforce Project RAND, Dec. 1962; Proceedings of the IEEE 51(5), 868-869 (1963).

I. S. Gradshteyn and I. M. Ryzhik, Table of Integrals, Series, and Products, fifth edition, Alan Jeffrey, Editor (Academic Press, Boston, 1980).

R. Blümel, N. Grzesiak, Y. Nam, Power-optimal, stabilized entangling gate between trapped-ion qubits, https://arxiv.org/abs/1905.09292 (2019).

P. H. Leung, K. A. Landsman, C. Figgatt, N. M. Linke, C. Monroe, K. R. Brown, Robust 2-qubit gates in a linear ion crystal using a frequency-modulated driving force, Phys. Rev. Lett. 120, 020501 (2018).

A. Potamianos and P. Maragos, Speech Analysis and Synthesis Using an AM/FM Modulation Model, Speech Communication 28, 195-209 (1999).

\* cited by examiner

DEMODULATION AND SMOOTHING OF AMPLITUDE, FREQUENCY, AND PHASE MODULATED PULSES FOR OPTIMAL IMPLEMENTATION OF ENTANGLING GATES IN ION TRAP QUANTUM COMPUTERS

CROSS-REFERENCE TO RELATED APPLICATIONS

This application claims priority to U.S. Provisional Patent Application Ser. No. 63/083,714, filed on Sep. 25, 2020, which is incorporated by reference herein.

BACKGROUND

Field

The present disclosure generally relates to a method of generating an entangling gate in an ion trap quantum computer, and more specifically, to a method of constructing a laser pulse to generate the entangling gate and smoothing the constructed laser pulse such that the pulse can be practically implemented.

Description of the Related Art

In quantum computing, quantum bits or qubits, which are analogous to bits representing a "0" and a "1" in a classical (digital) computer, are required to be prepared, manipulated, and measured (read-out) with near perfect control during a computation process. Imperfect control of the qubits leads to errors that can accumulate over the computation process, limiting the size of a quantum computer that can perform reliable computations.

Among physical systems upon which it is proposed to build large-scale quantum computers, is a chain of ions (i.e., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by a qubit-state dependent force using laser pulses that couple the ions to the collective motional modes of a chain of trapped ions, which arise from their Coulombic interaction between the ions.

However, there are practical limitations of controls of qubits that can be implemented in physical systems. For example, a pulse that varies too rapidly in time may not be implemented by a practical laser. Thus, there is a need for a procedure to accurately control qubits to perform a desired computation process within practical capabilities in physical systems.

SUMMARY

Embodiments of the present disclosure provide a method of performing a computation using an ion trap quantum computer. The method includes computing a phase function and an amplitude function of a laser pulse to cause entangling interaction between a pair of trapped ions of a plurality of trapped ions, each of the plurality of trapped ions having two frequency-separated states defining a qubit, smoothing the computed phase function of the laser pulse, computing a detuning frequency function of the laser pulse based on the smoothed phase function of the laser pulse, spline interpolating the computed detuning frequency function of the laser pulse, and applying a pulse having the spline interpolated detuning frequency function and the amplitude function to the pair of trapped ions.

As is discussed further below, the process of computing the phase function and amplitude function of a laser pulse, smoothing the computed phase function of the laser pulse, computing the detuning frequency function of the laser pulse, and spline interpolating the computed detuning frequency function of the laser pulse can be performed by use of a central processing unit and one or more software programs that are stored in memory of a classical computer. The process of applying the laser pulse having the spline interpolated detuning frequency function and the amplitude function to the pair of trapped ions can be performed by use of a central processing unit and one or more software programs that are stored in memory of a system controller, which is in communication with the classical computer.

Embodiments of the present disclosure also provide non-transitory computer-readable media. The non-transitory computer-readable media include computer instructions, which when executed by a processor, cause the processor to compute a phase function and an amplitude function of a laser pulse to cause entangling interaction between a pair of trapped ions of a plurality of trapped ions, each of the plurality of trapped ions having two frequency-separated states defining a qubit, smoothing the computed phase function of the laser pulse, computing a detuning frequency function of the laser pulse based on the smoothed phase function of the laser pulse, spline interpolating the computed detuning frequency function of the laser pulse, and applying a laser pulse having the spline interpolated detuning frequency function and the amplitude function to the pair of trapped ions.

Embodiments of the present disclosure further provide a quantum computing system. The quantum computing system includes a plurality of trapped ions, each of the trapped ions having two hyperfine states defining a qubit, and a controller comprising non-volatile memory having a number of instructions stored therein which, when executed by a processor, causes the quantum computing system to perform operations including computing a phase function and an amplitude function of a laser pulse to cause entangling interaction between a pair of trapped ions of the plurality of trapped ions, smoothing the computed phase function of the laser pulse, computing a detuning frequency function of the laser pulse based on the smoothed phase function of the laser pulse, spline interpolating the computed detuning frequency function of the laser pulse, and applying a laser pulse having the spline interpolated detuning frequency function and the amplitude function to the pair of trapped ions.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
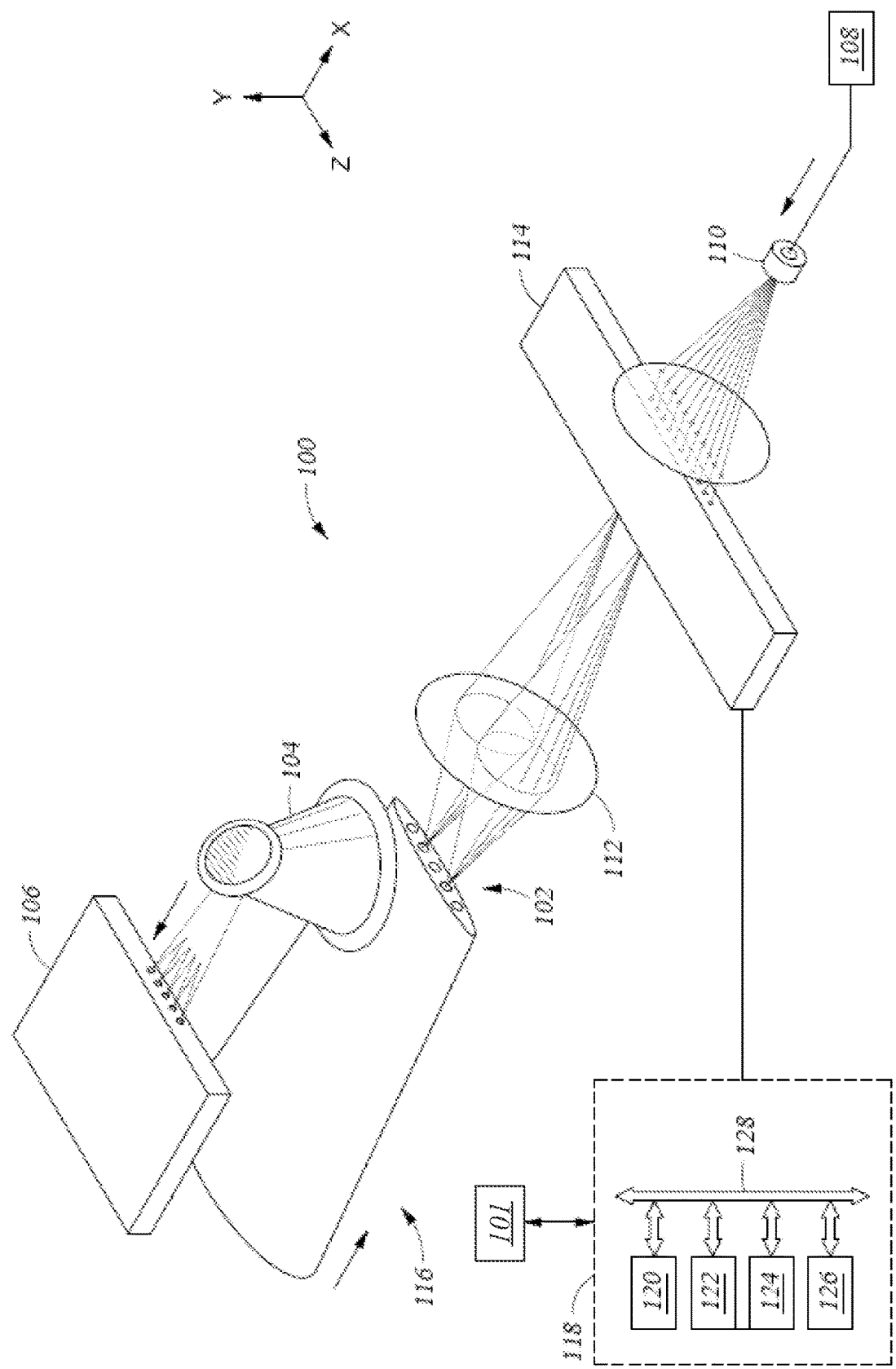
FIG. 1 is a partial view of an ion trap quantum computer according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method and a system for constructing and delivering a pulse to perform an entangling gate operation between two trapped ions during a quantum computation, and more specifically, to a method of demodulating and spline interpolating a pulse that can be practically implemented in the system while increasing the fidelity of the entangling gate operation, or the probability that at least two ions are in the intended qubit state(s) after performing the entangling gate operation between the two ions. It should be noted that although the method is described herein for the entangling gate operations between two ions, this method may also be used for single-qubit operations and entangling operations among more than two ions.

An overall system that is able to perform quantum computations using trapped ions will include a classical computer, a system controller, and a quantum register. The classical computer performs supporting and system control tasks including selecting a quantum algorithm to be run by use of a user interface, such as graphics processing unit (GPU), compiling the selected quantum algorithm into a series of universal quantum logic gates, translating the series of universal quantum logic gates into laser pulses to apply on the quantum register, and pre-calculating parameters related to the laser pulses (such as an amplitude function and a detuning function of a laser pulse, as described below) to perform gate operations, by use of software programs stored in memory and a central processing unit (CPU). A software program for performing the task of decomposing and executing the quantum algorithms is stored in a non-volatile memory within the classical computer. The quantum register includes trapped ions that are coupled with various hardware, including lasers to manipulate internal hyperfine states (qubit states) of the trapped ions and an acousto-optic modulator to modulate the laser beam and to read-out the internal hyperfine states (qubit states) of the trapped ions. The system controller receives from the classical computer the pre-calculated parameters for laser pulses at the beginning of performing gate operations on the quantum register, controls various hardware (e.g., laser(s), acousto-optic modulator (AOM), etc.) associated with controlling any and all aspects used to run the selected algorithm on the quantum register, and returns a read-out of the quantum register and thus output of results of the quantum computation(s) at the end of performing the gate operations to the classical computer.

The methods and systems described herein include processes for translating a quantum logic gate into laser pulses that are applied to a quantum register, and also processes for pre-calculating parameters that optimize the laser pulses that are applied to the quantum register and used to improve the performance of the quantum computer.

Among several known sets of universal logic gates by which any quantum algorithm can be decomposed, a set of universal logic gates, commonly denoted as {R, XX}, is native to a quantum computing system of trapped ions described herein. Here, the R gate corresponds to manipulation of individual qubit states of trapped ions, and the) XX gate (also referred to as an "entangling gate") corresponds to manipulation of the entanglement of two trapped ions. For those of ordinary skill in the art, it should be clear that the R gate can be implemented with near perfect fidelity, while the formation of the XX gate is complex and requires optimization for a given type of trapped ions, number of ions in a chain of trapped ions, and the hardware and environment in which the trapped ions are trapped, to name just a few factors, such that the fidelity of the XX gate is increased and computational errors within a quantum computer are avoided or decreased. In the following discussion, methods of generating and optimizing a pulse used to perform computations based on the formation of an XX gate that has an improved fidelity will be described.

As the size of a quantum computer increases, the complexity of the entangling gate operations used to perform quantum computations increases, and the complexity of the pulses used to perform these entangling gate operations also increases. There may be practical limitations in implementing the pulses with increased complexity. The method and system described in this disclosure modify such pulses so that they can be practically implemented without sacrificing accurate control of qubits.

General Hardware Configurations

FIG. 1 is a partial view of an ion trap quantum computer, or system 100, according to one embodiment. The system 100 includes a classical (digital) computer 101, a system controller 118 and a quantum register that is a chain 102 of trapped ions (i.e., five shown) that extend along the Z-axis. Each ion in the chain 102 of trapped ions is an ion having a nuclear spin I and an electron spin s such that a difference between the nuclear spin I and the electron spin s is zero, such as a positive ytterbium ion, $^{171}$Yb$^+$, a positive barium ion $^{133}$Ba$^+$, a positive cadmium ion $^{111}$Cd$^+$ or $^{113}$Cd$^+$, which all have a nuclear spin I=½ and the $^2S_{1/2}$ hyperfine states. In some embodiments, all ions in the chain 102 of trapped ions are the same species and isotope (e.g., $^{171}$Yb$^+$). In some other embodiments, the chain 102 of trapped ions includes one or more species or isotopes (e.g., some ions are $^{171}$Yb$^+$ and some other ions are $^{133}$Ba$^+$). In yet additional embodiments, the chain 102 of trapped ions may include various isotopes of the same species (e.g., different isotopes of Yb, different isotopes of Ba). The ions in the chain 102 of trapped ions are individually addressed with separate laser beams.

The classical computer 101 includes a central processing unit (CPU), memory, and support circuits (or I/O). The memory is connected to the CPU, and may be one or more of a readily available memory, such as a read-only memory (ROM), a random-access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 104, such as an objective lens with a numerical aperture (NA), for example, of 0.37, collects fluorescence along the Y-axis from the ions and maps each ion onto a multi-channel photo-multiplier tube (PMT) 106 for measurement of individual ions. Non-copropagating Raman laser beams from a laser 108, which are provided along the X-axis, perform operations on the ions. A diffractive beam splitter 110 creates an array of static Raman beams 112 that are individually switched using a multi-channel acousto-optic modulator (AOM) 114 and is configured to selectively act on individual ions. A global Raman laser beam 116 illuminates ions at once. In some embodiments, individual Raman laser beams (not shown) each illuminate individual ions. The system controller (also referred to as a "RF controller") 118 controls the AOM 114. The system controller 118 includes a central processing unit (CPU) 120, a read-only memory (ROM) 122, a random-access memory (RAM) 124, a storage unit 126, and the like. The CPU 120 is a processor of the system controller 118. The ROM 122 stores various programs and the RAM 124 is the working memory for various programs and data. The storage unit 126 includes a nonvolatile memory, such as a hard disk drive (HDD) or a flash memory, and stores various programs even if power is turned off. The CPU 120, the ROM 122, the RAM 124, and the storage unit 126 are interconnected via a bus 128. The system controller 118 executes a control program which is stored in the ROM 122 or the storage unit 126 and uses the RAM 124 as a working area. The control program will include one or more software applications that include program code (e.g., instructions) that may be executed by a processor in order to perform various functionalities associated with receiving and analyzing data and controlling any and all aspects of the methods and hardware used to create the ion trap quantum computer system 100 discussed herein.

Figure 2:
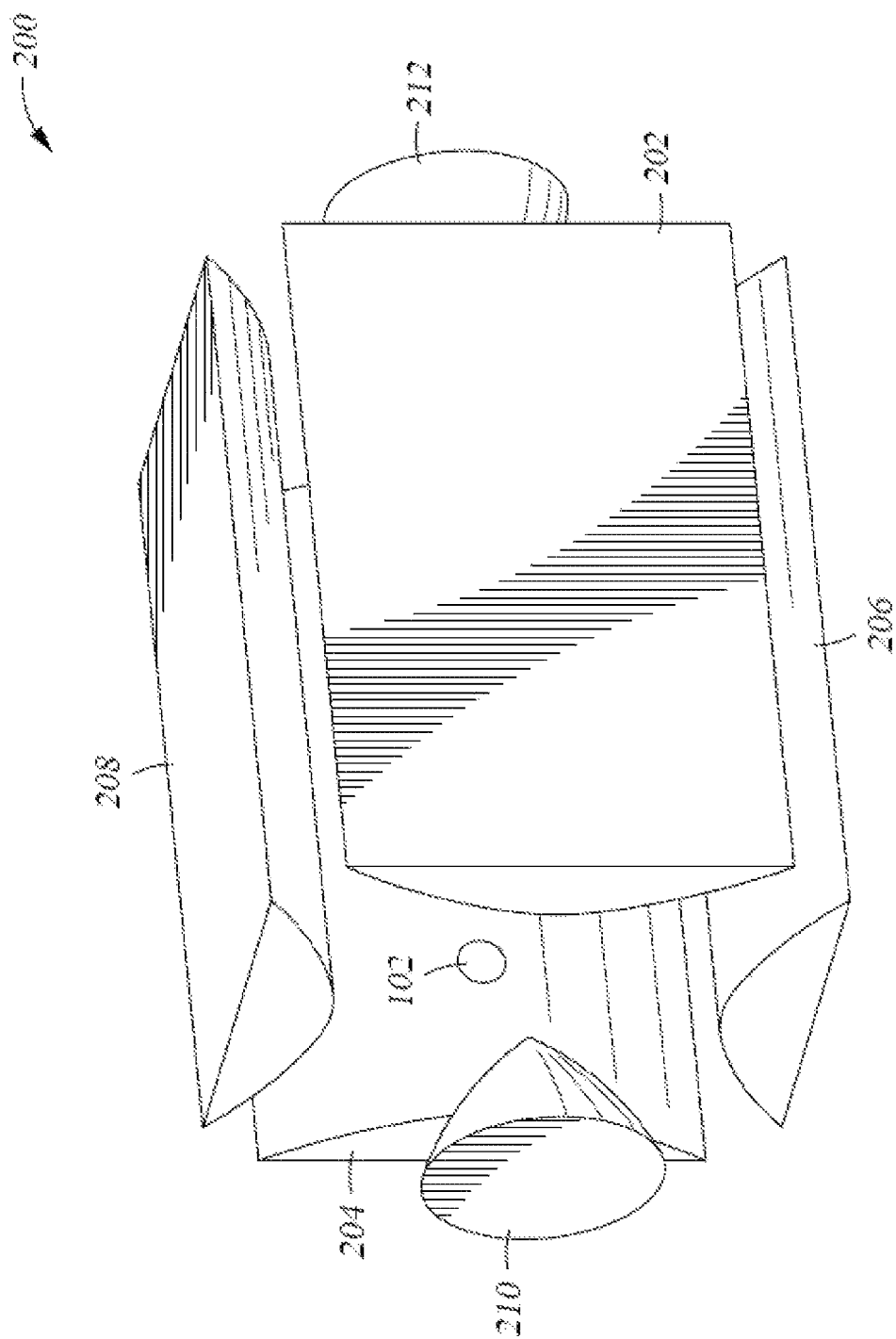
FIG. 2 depicts a schematic view of an ion trap for confining ions in a chain according to one embodiment.

FIG. 2 depicts a schematic view of an ion trap 200 (also referred to as a Paul trap) for confining ions in the chain 102 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction," "longitudinal direction," or "first direction"). The ions in the chain 102 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to the opposing pair of electrodes 202, 204 and a sinusoidal voltage $V_2$ with a phase shift of 180° from the sinusoidal voltage $V_1$ (and the amplitude $V_{RF}/2$) is applied to the other opposing pair of electrodes 206, 208 at a driving frequency $\omega_{RF}$, generating a quadrupole potential. In some embodiments, a sinusoidal voltage is only applied to one opposing pair of electrodes (e.g., 202, 204), and the other opposing pair of electrodes (206, 208) are grounded. The quadrupole potential creates an effective confining force in the X-Y plane perpendicular to the Z-axis (also referred to as a "radial direction," "transverse direction," or "second direction") for each of the trapped ions, which is proportional to the distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Trapped Ion Configuration and Quantum Bit Information

Figure 3A:
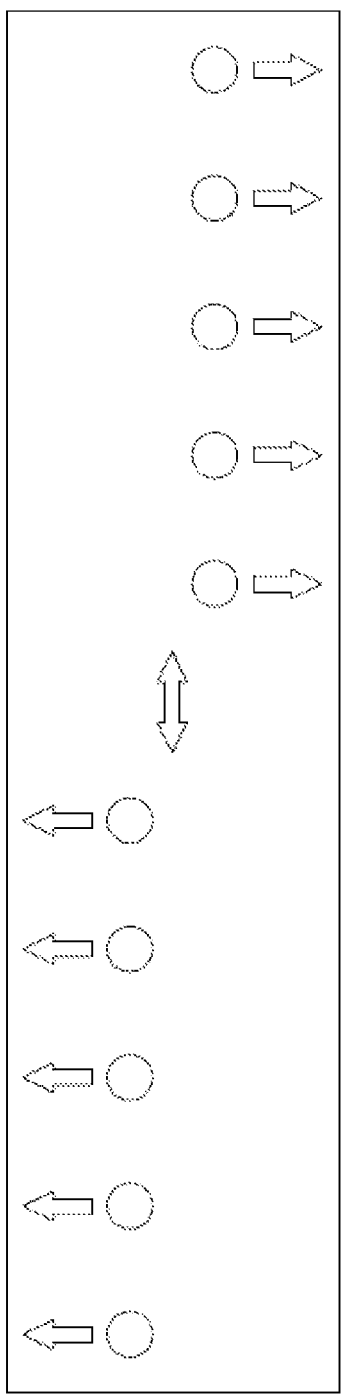
FIGS. 3A, 3B, and 3C depict a few schematic collective transverse motional mode structures of a chain of five trapped ions.
Figure 3B:
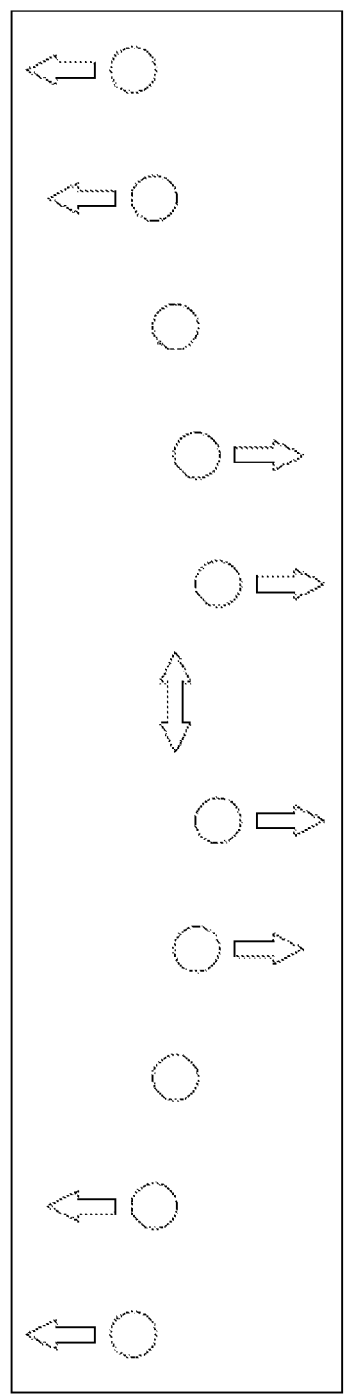
Figure 3C:
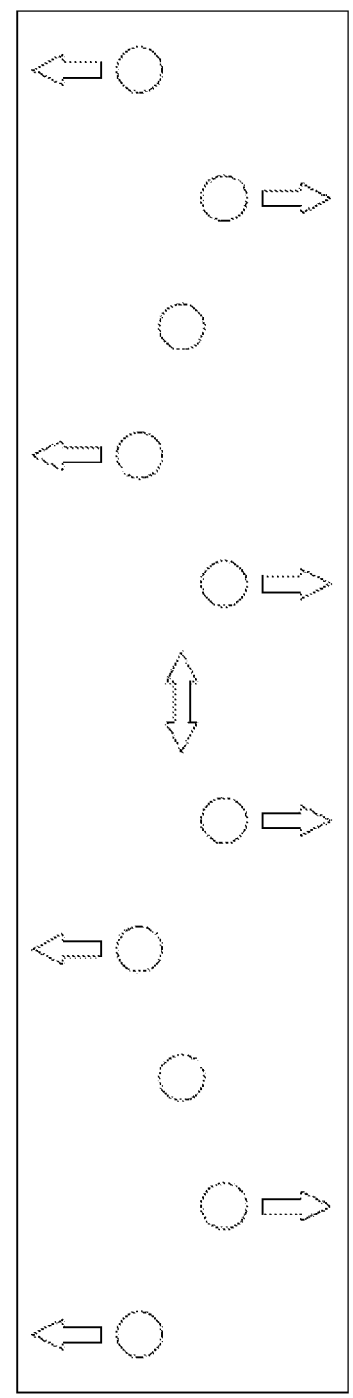

FIGS. 3A, 3B, and 3C depict a few schematic structures of collective transverse motional modes (also referred to simply as "motional mode structures") of a chain 102 of five trapped ions, for example. Here, the confining potential due to a static voltage $V_S$ applied to the end-cap electrodes 210 and 212 is weaker compared to the confining potential in the radial direction. The collective motional modes of the chain 102 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the p-th lowest energy is hereinafter referred to as $|n_{ph}\rangle_p$, where $n_{ph}$ denotes the number of motional quanta (in units of energy excitation, referred to as phonons) in the motional mode, and the number of motional modes P in a given transverse direction is equal to the number of trapped ions N in the chain 102. FIGS. 3A-3C schematically illustrate examples of different types of collective transverse motional modes that may be experienced by five trapped ions that are positioned in a chain 102. FIG. 3A is a schematic view of a common motional mode $|n_{ph}\rangle_P$ having the highest energy, where P is both the number of the mode and the total number of motional modes. In the common motional mode $|n_{ph}\rangle_P$, all ions oscillate in phase in the transverse direction. FIG. 3B is a schematic view of a tilt motional mode $|n_{ph}\rangle_{P-1}$ which has the second highest energy. In the tilt motional mode, ions on opposite ends move out of phase in the transverse direction (i.e., in opposite directions). FIG. 3C is a schematic view of a higher-order motional mode $|n_{ph}\rangle_{P-3}$ which has a lower energy than that of the tilt motional mode $|n_{ph}\rangle_{P-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 4:
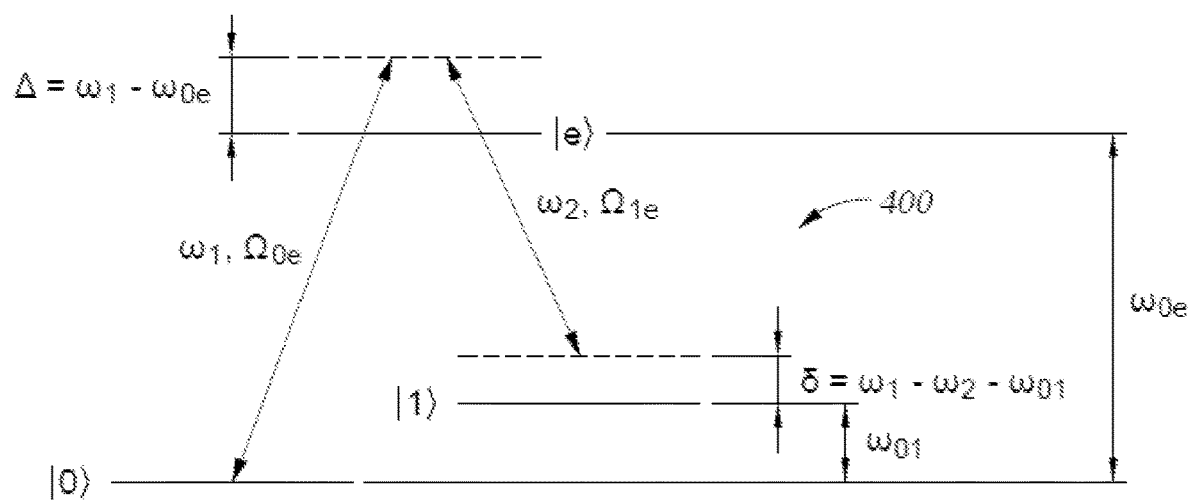
FIG. 4 depicts a schematic energy diagram of each ion in a chain of trapped ions according to one embodiment.

FIG. 4 depicts a schematic energy diagram 400 of each ion in the chain 102 of trapped ions according to one embodiment. Each ion in the chain 102 of trapped ions is an ion having a nuclear spin I and an electron spin s such that a difference between the nuclear spin I and the electron spin s is zero. In one example, each ion may be a positive ytterbium ion, $^{171}\text{Yb}^+$, which has a nuclear spin I=½ and the $^2S_{1/2}$ hyperfine states (i.e., two electronic states) with an energy split corresponding to a frequency difference (referred to as a "carrier frequency") of $\omega_{01}/2\pi$=12.642812 GHz. In other examples, each ion may be a positive barium ion $^{133}\text{Ba}^+$, a positive cadmium ion $^{111}\text{Cd}^+$ or $^{113}\text{Cd}^+$, which all have a nuclear spin I=½ and the $^2S_{1/2}$ hyperfine states. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_p$ for any motional mode p with no phonon excitation (i.e., $n_{ph}$=0) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_p$ with the subscript p denotes the motional ground state for a motional mode p of a chain 102 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 4, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 4. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than the two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($\text{Be}^+$, $\text{Ca}^+$, $\text{Sr}^+$, $\text{Mg}^+$, and $\text{Ba}^+$) or transition metal ions ($\text{Zn}^+$, $\text{Hg}^+$, $\text{Cd}^+$).

Figure 5:
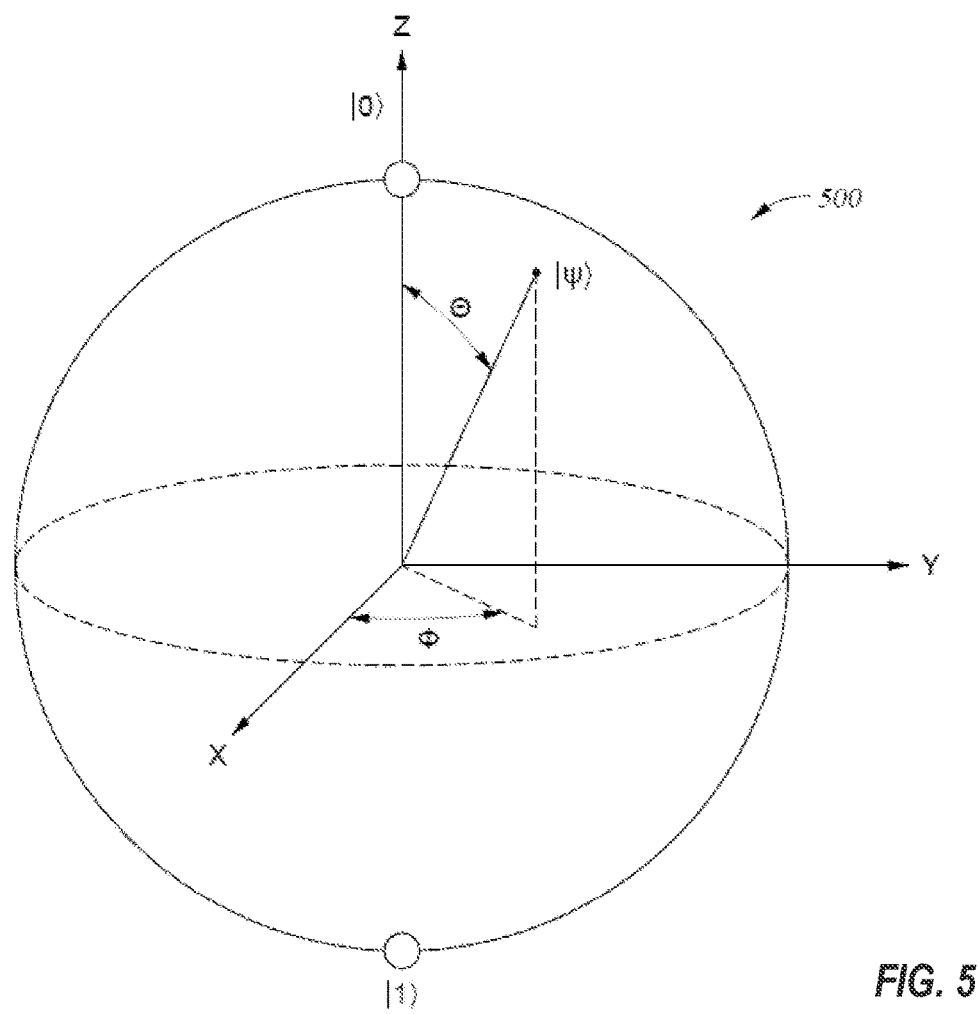
FIG. 5 depicts a qubit state of an ion represented as a point on the surface of the Bloch sphere.

FIG. 5 is provided to help visualize a qubit state of an ion, represented as a point on the surface of the Bloch sphere 500 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "π-pulse". Further, by adjusting time duration and amplitudes of the composite pulse, the qubit state $|0\rangle$ may be transformed to a superposition state $|0\rangle+|1\rangle$, where the two qubit-states $|0\rangle$ and $|1\rangle$ are added and equally-weighted in-phase (a normalization factor of the superposition state is omitted hereinafter without loss of generality) and the qubit state $|1\rangle$ to a superposition state $|0\rangle-|1\rangle$, where the two qubit-states $|0\rangle$ and $|1\rangle$ are added equally-weighted but out of phase. This application of the composite pulse is referred to as a "π/2-pulse". More generally, a superposition of the two qubit-states $|0\rangle$ and $|1\rangle$ that are added and equally-weighted is represented by a point that lies on the equator of the Bloch sphere. For example, the superposition states $|0\rangle \pm |1\rangle$ correspond to points on the equator with the azimuthal angle $\phi$ being zero and π, respectively. The superposition states that correspond to points on the equator with the azimuthal angle $\phi$ are denoted as $|0\rangle+e^{i\phi}|1\rangle$ (e.g., $|0\rangle\pm i|1\rangle$ for $\phi=\pm\pi/2$). Transformation between two points on the equator (i.e., a rotation about the Z-axis on the Bloch sphere) can be implemented by shifting phases of the composite pulse.

Figure 6A:
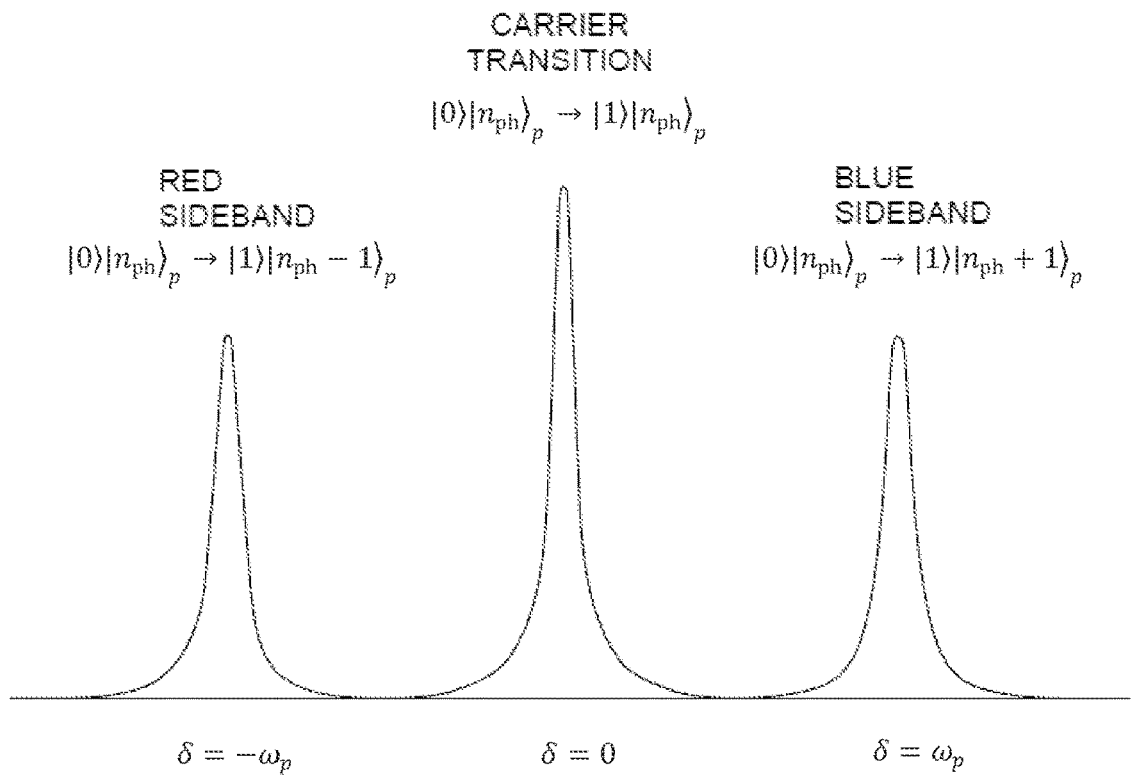
FIGS. 6A and 6B depict schematic views of the motional sideband spectrum of each ion and a motional mode according to one embodiment.
Figure 6B:
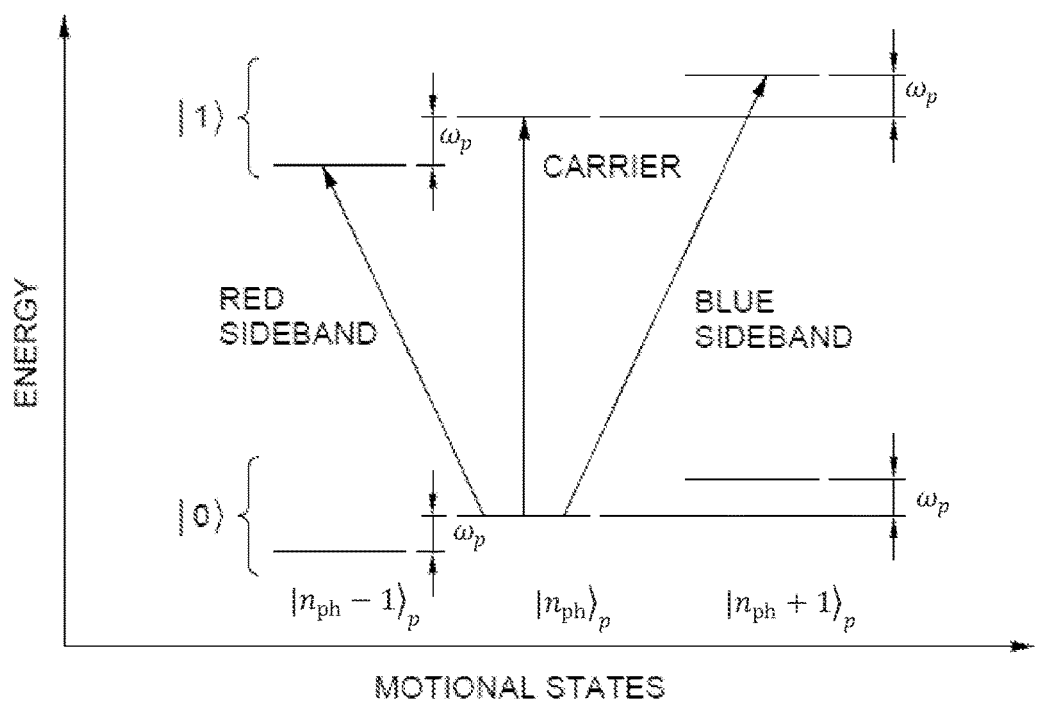

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the chain 102 in a motional mode $|n_{ph}\rangle_p$ having frequency $\omega_p$ according to one embodiment. As illustrated in FIG. 6B, when the detuning frequency of the composite pulse is zero (i.e., the frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2\omega_{01}=\mu>0$, referred to as a blue sideband), Rabi flopping between combined qubit-motional states $|0\rangle n_{ph}\rangle_p$ and $|1\rangle |n_{ph}+1\rangle_p$ occurs (i.e., a transition from the p-th motional mode with $n_{ph}$-phonon excitations denoted by $|n_{ph}\rangle_p$ to the p-th motional mode with $(n_{ph}+1)$-phonon excitations denoted by $|n_{ph}+1\rangle_p$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_p$ of the motional mode $|n_{ph}\rangle_p$, $\delta=\omega_1-\omega_2-\omega_{01}=<0$, referred to as a red sideband), Rabi flopping between combined qubit-motional states $|0\rangle |n_{ph}\rangle_p$ and $|1\rangle |n_{ph}-1\rangle_p$ occurs (i.e., a transition from the motional mode $|n_{ph}\rangle_p$ to the motional mode $|n_{ph}-1\rangle_p$ with one less phonon excitations occurs when the qubit state $|0\rangle$ flips to $|1\rangle$). A π/2-pulse on the blue sideband applied to a qubit transforms the combined qubit-motional state $|0\rangle |n_{ph}\rangle_p$ into a superposition of $|0\rangle |n_{ph}\rangle_p$ and $|1\rangle |n_{ph}+1\rangle_p$. A π/2-pulse on the red sideband applied to a qubit transforms the combined qubit-motional state $|0\rangle |n_{ph}\rangle_p$ into a superposition of $|0\rangle |n_{ph}\rangle_p$ and $|1\rangle |n_{ph}-1\rangle_p$. When the two-photon Rabi frequency $\Omega(t)$ is smaller as compared to the detuning frequency $\delta=\omega_1-\omega_2-\omega_{01}=\pm\mu$ the blue sideband transition or the red sideband transition may be selectively driven. Thus, a qubit can be entangled with a desired motional mode by applying the right type of pulse, such as a π/2-pulse, which can be subsequently entangled with another qubit, leading to an entanglement between the two qubits. Entanglement between qubits is needed to perform an XX-gate operation in an ion trap quantum computer.

By controlling and/or directing transformations of the combined qubit-motional states as described above, an XX-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, $|1\rangle_i|1\rangle_j$, $|0\rangle_i|0\rangle_j \to |0\rangle_i|0\rangle_j - i|1\rangle_i|1\rangle_j$ $|0\rangle_i|1\rangle_j \to |0\rangle_i|1\rangle_j - i|1\rangle_i|0\rangle_j$ $|1\rangle_i|0\rangle_j \to i|0\rangle_i|1\rangle_j + |1\rangle_i|0\rangle_j$ $|1\rangle_i|1\rangle_j \to i|0\rangle_i|0\rangle_j + |1\rangle_i|1\rangle_j$.

For example, when the two qubits (i-th and j-th qubits) are both initially in the hyperfine ground state $|0\rangle$ (denoted as $|0\rangle_i|0\rangle_j$) and subsequently a π/2-pulse on the blue sideband is applied to the i-th qubit, the combined state of the i-th qubit and the motional mode $|0\rangle_i|n_{ph}\rangle_p$ is transformed into a superposition of $|0\rangle_i|n_{ph}\rangle_p$ and $|1\rangle_i|n_{ph}+1\rangle_p$, and thus the combined state of the two qubits and the motional mode is transformed into a superposition of $|0\rangle_i|0\rangle_j|n_{ph}\rangle_p$ and $|1\rangle_i|0\rangle_j|n_{ph}+1\rangle_p$. When a π/2-pulse on the red sideband is applied to the j-th qubit, the combined state of the j-th qubit and the motional mode $|0\rangle_j|n_{ph}\rangle_p$ is transformed to a superposition of $|0\rangle_j|n_{ph}\rangle_p$ and $|1\rangle_j|n_{ph}\rangle_p$ and the combined state $|0\rangle_j|n_{ph}+1\rangle_p$ is transformed into a superposition of $|0\rangle_j|n_{ph}+1\rangle_p$ and $|1\rangle_j|n_{ph}\rangle_p$.

Thus, applications of a π/2-pulse on the blue sideband on the i-th qubit and a π/2-pulse on the red sideband on the j-th qubit may transform the combined state of the two qubits and the motional mode $|0\rangle_i|0\rangle_j|n_{ph}\rangle_p$ into a superposition of $|0\rangle_i|0\rangle_j|n_{ph}\rangle_p$ and $|1\rangle_i|1\rangle_j|n_{ph}\rangle_p$, the two qubits now being in an entangled state. For those of ordinary skill in the art, it should be clear that two-qubit states that are entangled with a motional mode having a different number of phonon excitations from the initial number of phonon excitations $n_{ph}$ (i.e., $|1\rangle_i|0\rangle_j|n_{ph}+1\rangle_p$ and $|0\rangle_i|1\rangle_j|n_{ph}-1\rangle_p$) can be removed by a sufficiently complex pulse sequence, and thus the combined state of the two qubits and the motional mode after the XX-gate operation may be considered disentangled as the initial number of phonon excitations $n_{ph}$ in the p-th motional mode stays unchanged at the end of the XX-gate operation. Thus, qubit states before and after the XX-gate operation will be described below generally without including the motional modes.

More generally, the combined state of i-th and j-th qubits transformed by the application of the composite pulse on the sidebands for duration τ (referred to as a "gate duration"), having an amplitude function $\Omega(t)$ and a detuning frequency function $\mu(t)$, can be described in terms of an entangling interaction $\chi_{i,j}(\tau)$ as follows:

$|0\rangle_i|0\rangle_j \to \cos(2\chi_{i,j}(\tau))|0\rangle_i|0\rangle_j - i\sin(2\chi_{i,j}(\tau))|1\rangle_i|1\rangle_j$ $|0\rangle_i|1\rangle_j \to \cos(2\chi_{i,j}(\tau))|0\rangle_i|1\rangle_j - i\sin(2\chi_{i,j}(\tau))|1\rangle_i|0\rangle_j$ $|1\rangle_i|0\rangle_j \to i\sin(2\chi_{i,j}(\tau))|0\rangle_i|1\rangle_j + \cos(2\chi_{i,j}(\tau))|1\rangle_i|0\rangle_j$ $|1\rangle_i|1\rangle_j \to i\sin(2\chi_{i,j}(\tau))|0\rangle_i|0\rangle_j + \cos(2\chi_{i,j}(\tau))|1\rangle_i|1\rangle_j$ where, $\chi_{i,j}(\tau)=\Sigma_{p=1}^{P}\eta_{i,p}\eta_{j,p}\int_0^\tau dt\int_0^t dt'\Omega(t)\Omega(t')\sin(\psi(t))\sin(\psi(t'))\sin[\omega_p(t'-t)]$, $\eta_{i,p}$ is the Lamb-Dicke parameter that quantifies the coupling strength between the i-th ion and the p-th motional mode having the frequency $\omega_p$, $\psi(t)$ is an accumulated phase function (also referred to simply as a "phase function") $\psi(t)=\psi_0^t+\int_0^t \mu(t')dt'$ of the pulse, $\psi_0$ is an initial phase which may be assumed to be zero (0) hereinafter for simplicity without loss of generality, and P is the number of the motional modes (equal to the number N of ions in the chain 102).

Construction of Pulses for Entangling Gate Operations

The entanglement between two qubits (trapped ions) described above can be used to perform an XX-gate operation. The XX-gate operation (XX gate) along with single-qubit operations (R gates) forms a set of universal gates {R, XX} that can be used to build a quantum computer to perform desired computational processes. In constructing a pulse to deliver to the chain 102 of trapped ions for performing an XX-gate operation between two trapped ions (e.g., i-th and j-th trapped ions) in the chain 102, an amplitude function $\Omega(t)$ and a detuning frequency function $\mu(t)$ of the pulse are adjusted as control parameters to ensure the pulse performs the intended XX-gate operation, by imposing the following conditions. First, all trapped ions in the chain 102 that are displaced from their initial positions as the motional modes are excited by the delivery of the pulse must return to their initial positions at the end of the XX-gate operation. This first condition is referred to as the condition for returning of trapped ions to their original positions and momentum values, or the condition for closure of phase space trajectories, as described below in detail. Second, the XX-gate operation must be robust and stabilized against fluctuations in frequencies of the motional modes. This second condition is referred to as the condition for stabilization. Third, the entangling interaction $\chi_{i,j}(\tau)$ generated between the i-th and j-th trapped ions by the pulse must have a desired value $\theta_{i,j}$ ($\theta_{i,j} \neq 0$). This third condition is referred to as the condition for non-zero entangling interaction. Fourth, the required laser power to implement a pulse may be minimized. This fourth condition is referred to as the condition for minimized power.

As described above, the first condition (also referred to as the condition for returning of trapped ions to their original positions and momentum values, or the condition for closure of phase space trajectories) is that the trapped ions that are displaced from their initial positions as the motional modes are excited by the delivery of the pulse return to their initial positions. A l-th trapped ion in a superposition state $|0\rangle \pm |1\rangle$ is displaced due to the excitation of the p-th motional mode during the gate duration T and follows the trajectories $\pm \alpha_{l,p}(t')$ in phase space (position and momentum) of the p-th motional mode. The phase space trajectories $\alpha_{l,p}(t') = \int_0^{t'} g(t) e^{i\omega_p t} dt$ are determined by the amplitude function $\Omega(t)$ and the accumulated phase function $\psi(t) = \int_0^t \mu(t') dt'$ of the pulse, where g(t) is the pulse function defined as $g(t) = \Omega(t) \sin(\psi(t))$. Thus, for the chain 102 of N trapped ions, the condition $\alpha_{l,p}(\tau) = 0$ (i.e., the trajectories $\alpha_{l,p}(\tau)$ are closed) must be imposed for all P motional modes (p=1, 2, . . . , P).

The second condition (also referred to as the condition for stabilization) is that an XX-gate operation generated by the pulse is robust and stabilized against external errors, such as fluctuations in the frequencies $\omega_p$ of the motional modes and the intensities of laser beams. In the ion trap quantum computer, or system 100, there can be fluctuations in the frequencies $\omega_p$ of the motional modes due to stray electric fields, build-up charges in the ion trap 200 caused by photoionization or temperature fluctuations. Typically over a time span of minutes, the frequencies $\omega_p$ of the motional modes drift with excursion of $\Delta\omega_p/(2\pi) \approx 1$ kHz. The condition for closure of phase space trajectories based on the frequencies $\omega_p$ of the motional modes are no longer satisfied when the frequencies of the motional modes have drifted to $\omega_p + \Delta\omega_p$, resulting in a reduction of the fidelity of the XX gate operation. It is known that the average infidelity 1−F of an XX gate operation between the i-th and j-th trapped ions at zero temperature of the motional-mode phonons, is given by $1-F = 4/5 \Sigma_P (|\alpha_{i,p}|^2 + |\alpha_{j,p}|^2)$. This suggests the XX-gate operation can be stabilized against a drift $\Delta\omega_p$ in the frequencies $\omega_p$ of the motional modes by requiring that the phase space trajectories $\alpha_{l,p}$ (l=i, j) be stationary up to K-th order with respect to variations $\Delta\omega_p$ in $\omega_p$, $$\frac{\partial^k \alpha_{l,p}(\tau)}{\partial \omega_p^k} = \int_0^\tau dt (it)^k g(t) e^{i\omega_p t} = 0$$

$$(l = 1, 2, \ldots, N, p = 1, 2, \ldots, P, k = 1, 2, \ldots, K)$$

(referred to as K-th order stabilization), where K is the maximal desired degree of stabilization. The pulse computed by requiring this condition for stabilization can perform an XX gate operation that is resilient against noise (i.e., a drift in the frequencies $\omega_p$ of the motional modes).

The third condition (also referred to as the condition for non-zero entangling interaction) is that the entangling interaction $\chi_{i,j}(\tau)$ generated between the i-th and j-th trapped ions by the pulse has a desired non-zero value $\theta_{i,j}$ ($\theta_{i,j} \neq 0$). The transformations of the combined state of the i-th and j-th trapped ions described above correspond to the XX-gate operation with maximal entanglement when $|\theta_{i,j}| = \pi/8$. In the example described below, the same pulse is applied to both the i-th and the j-th trapped ions. However, in some embodiments, different pulses are applied to the i-th and the j-th trapped ions.

The fourth condition (also referred to as the condition for minimized power) is that the pulse is power-optimal, in which the required laser power is minimized. Since the required laser power is inversely proportional to the gate duration $\tau$, a power-optimal pulse implements an XX gate operation with minimum power requirement if the gate duration $\tau$ is fixed, or with shortest gate duration $\tau$ if the laser power budget is fixed.

In some embodiments, the amplitude function $\Omega(t)$ and the detuning frequency function $\mu(t)$ are chosen to be symmetric or anti-symmetric in time with respect to the middle point of the gate duration, $$t = \tau/2, \text{ i.e., } \Omega^{(\pm)}\left(\frac{\tau}{2} - t\right) = \pm \Omega^{(\pm)}\left(\frac{\tau}{2} + t\right), \mu^{(\pm)}\left(\frac{\tau}{2} - t\right) = \pm \mu^{(\pm)}\left(\frac{\tau}{2} + t\right).$$

In the example described below, the amplitude function $\Omega(t)$ and the detuning frequency function $\mu(t)$ are chosen to be symmetric ($\Omega^{(+)}(t)$ and $\mu_{(+)}(t)$) for simplicity and may be referred to as $\Omega(t)$ and $\mu(t)$ without the superscript (+).

The condition for closure of phase space trajectories can be rewritten in terms of the anti-symmetric component $g^{(-)}(t)$ of the pulse function g(t) (also referred to as "negative-parity pulse function" or simply as "pulse function" hereinafter), as $$\alpha_{l,p}(\tau) = \int_0^\tau g^{(-)}(t) e^{i\omega_p t} dt =$$

$$0 \mapsto \sum_{n=1}^{N_A} M_{pn} B_n = 0 \quad (l = 1, 2, \ldots, N, p = 1, 2, \ldots, P),$$

where $M_{pn}$ is defined as $$M_{pn} = \int_0^\tau \sin\left(2\pi n \frac{t}{\tau}\right) e^{i\omega_p t} dt \quad (p = 1, 2, \ldots, P, n = 1, 2, \ldots, N_A).$$

Here the pulse function $g^{(-)}(t)$ is expanded in a complete basis, for example, a Fourier-sine basis $g^{(-)}(t)=\Sigma_{n=1}^{N_A} B_n \sin(2\pi nt/\tau)$ over the gate duration $\tau$, using basis functions $\sin(2\pi nt/\tau)$ and Fourier coefficients $B_n$ (n=1, 2, . . . , $N_A$). Equivalently, the condition for closure of phase space trajectories can be written as $M\vec{B}=0$ in matrix form, where M is the $P \times N_A$ coefficient matrix of $M_{pn}$ and $\vec{B}$ is the $N_A$ Fourier coefficient vector of $B_n$. The number of basis functions $N_A$ is chosen to be larger than the number of motional modes P and large enough to achieve convergence in the computing of the pulse function $g^{(-)}(t)$.

The condition for K-th order stabilization against fluctuations in the frequencies $\omega_p$ of the motional modes can be rewritten in matrix form as $$\frac{\partial^k \alpha_{l,p}(\tau)}{\partial \omega_p^k} = \left(\frac{\partial^k}{\partial \omega_p^k}\right) \int_0^\tau g^{(-)}(t) e^{i\omega_p t} dt = \int_0^\tau (it)^k g^{(-)}(t) e^{i\omega_p t} dt = 0$$

$$\mapsto \sum_{n=1}^{N_A} M_{pn}^k B_n = 0 \ (l=1, 2, \ldots, N, \ p=1, 2, \ldots, P, \ k=1, 2, \ldots, K),$$

where $M_{pn}^k$ is defined as $$M_{pn}^k = \int_0^\tau (it)^k \sin\left(2\pi n \frac{t}{\tau}\right) e^{i\omega_p t} dt \ (p=1, 2, \ldots, P, \ n=1, 2, \ldots, N_A).$$

Equivalently, the condition for K-th order stabilization can be written as $M^k \vec{B}=0$ (k=1, 2, . . . , K) in matrix form, where $M^k$ is the $P \times N_A$ coefficient matrix of $M_{pn}^k$ and $\vec{B}$ is a $N_A$ Fourier coefficient vector of $B_n$.

The method of K-th order stabilization is not exclusive to stabilization against mode-frequency errors. It applies to stabilization against all parameters that can be brought into linear matrix form akin to the above-described stabilization against mode-frequency errors. An example is K-th order stabilization against pulse-timing errors.

The condition for closure of phase space trajectories and the condition for k-th order stabilization can be written concisely in the form $$\sum_{n=1}^{N_A} M_{pn}^k B_n = 0 \ (l=1, 2, \ldots, N, \ p=1, 2, \ldots, P, \ k=0, 1, \ldots, K),$$

where k=0 corresponds to the condition for closure of phase space trajectories. Thus, there are $N_0$ (=$N_A$-P(K+1)) non-trivial (i.e., in general, at least one of the Fourier coefficients $B_n$ is non-zero) Fourier coefficient vectors (referred to as null-space vectors) $\vec{B}^{(\alpha)}$ ($\alpha$=1, 2, . . . , $N_0$) that satisfy the condition for closure of phase space trajectories and the condition for stabilization ($\Sigma_{n=1}^{N_A} M_{pn}^k B_n=0$, k=1, 2, . . . , K). Once these null-space vectors $\vec{B}^{(\alpha)}$ ($\alpha$=1, 2, . . . , $N_0$) are computed, the Fourier coefficient vector $\vec{B}$ of $B_n$ can be constructed by computing a linear combination ($\Sigma_{\alpha=1}^{N_0} \Lambda_\alpha \vec{B}^{(\alpha)}$) of the Fourier coefficient vectors $\vec{B}^{(\alpha)}$, in which the coefficients $\Lambda_\alpha$ are determined such that the remaining conditions, the condition for non-zero entangling interaction and the condition for minimized power, are satisfied.

The condition for non-zero entangling interaction can be rewritten in terms of the pulse function $g^{(-)}t$ as $$\chi_{i,j}(\tau) = \sum_{p=1}^{P} \eta_{i,p} \eta_{j,p} \int_0^\tau dt \int_0^t dt' g_i^{(-)}(t) g_j^{(-)}(t') \sin[\omega_p(t'-t)] = \theta_{i,j}$$

$$\mapsto \sum_{n=1}^{N_A} \sum_{m=1}^{N_A} B_n D_{nm} B_m = \theta_{i,j},$$

where $D_{nm}$ is defined as $$D_{nm} = \sum_{p=1}^{P} \eta_{i,p} \eta_{j,p} \int_0^\tau dt \int_0^\tau dt' \sin\left(2\pi n \frac{t}{\tau}\right) \sin[\omega_p(t'-t)] \sin\left(2\pi m \frac{t'}{\tau}\right),$$

or equivalently, $\vec{B}^T D \vec{B} = \theta_{i,j}$ in matrix form, where D is the $N_A \times N_A$ coefficient matrix of $D_{nm}$ and $\vec{B}^T$ is the transposed vector of $\vec{B}$.

The condition for minimized power corresponds to minimizing a power function, $$P = \|g^{(-)}(t)\|^2 = 1/\tau \int_0^\tau [g^{(-)}(t)]^2 dt = (1/2) \Sigma_{n=1}^{N_A} B_n^2$$

that is the absolute square value of the pulse function $g^{(-)}(t)$ averaged over the gate duration $\tau$.

Thus, the amplitude function $\Omega(t)$ and the detuning frequency function $\mu(t)$ of a pulse can be computed based on the pulse function $g^{(-)}(t)$ having the Fourier coefficients $B_n$ (n=1, 2, . . . , $N_A$) (i.e., frequency components of the pulse function $g^{(-)}(t)$) or equivalently the Fourier coefficient vector $\vec{B}$, that satisfy the condition for closure of phase space trajectory, the condition for stabilization, the condition for non-zero entangling interaction, and the condition for minimized power. It should be noted that these conditions are in linear algebraic forms in terms of the Fourier coefficient vector $\vec{B}$. Thus, the Fourier coefficients $B_n$ that satisfy these conditions can be computed by known linear algebraic computational methods without approximation or iterations. Once the Fourier coefficients $B_n$ are computed, the pulse function $g^{(-)}(t)$ can be computed.

Continuous Demodulation

While in some embodiments the pulse function $g^{(-)}(t)$ is implemented directly with the help of an arbitrary-waveform generator (AWG), in other embodiments the amplitude function $\Omega(t)$ and the detuning frequency function $\mu(t)$ of the pulse need to be demodulated from the computed pulse function $g^{(-)}(t) = \Omega(t) \sin(\psi(t))$, where the phase function $\psi(t) = \int_0^t \mu(t') dt'$ is the phase accumulated due to the detuning frequency function $\mu(t)$. That is, the amplitude function $\Omega(t)$ and the detuning frequency function $\mu(t)$ are extracted from the pulse function $g^{(-)}(t)$ such that a pulse having the amplitude function $\Omega(t)$ and the detuning frequency function $\mu(t)$ can be implemented. If this demodulation process is performed with a fixed detuning frequency, i.e., $\mu(t)=\mu_0$, the resulting pulse is an amplitude-modulated (AM) pulse, in which the amplitude function $\Omega(t)$ is modulated. If the demodulation process is performed with a fixed amplitude, i.e., $\Omega(t)=\Omega_0$, the resulting pulse is a phase-modulated (PM) pulse, in which the phase function $\psi(t)$ is modulated. If the phase function ψ(t) is implemented by modulating the detuning frequency function μ(t), the resulting pulse is a frequency-modulated (FM) pulse. The demodulation process can be performed in any combined modulation of amplitude function Ω(t), phase function ψ(t) (thereby the detuning frequency function 140), and frequency to construct a pulse by conventional demodulation methods known in the art of signal processing. Even if it is desired to implement $g^{(-)}(t)$ via an AWG, and the AWG has enough bandwidth to represent $g^{(-)}(t)$ with sufficient accuracy, the components of the system 100, driven by the AWG, may not have the bandwidth of the AWG, resulting in loss of fidelity. Therefore, in these cases, before it is implemented via an AWG, the pulse $g^{(-)}(t)$ may be pre-processed using the demodulation and smoothing techniques as described in this disclosure.

The first step of an exemplary demodulation process is to define an auxiliary function $G(t)=H[g^{(-)}(t)]=\Sigma_{n=1}^{N_A} B_n \cos(2\pi n t/\tau)$, where $H[g^{(-)}(t)]$ is the Hilbert-transform of the pulse function $g^{(-)}(t)$ and a complex auxiliary function $f(t)=G(t)+ig^{(-)}(t)$. The complex auxiliary function $f(t)$ can be written in polar form using the absolute value of the complex auxiliary function $f(t)$, $|f(t)|$ (written as R(t) hereinafter), and the argument of the complex auxiliary function $f(t)$, $\arg(f(t))$ (written as φ(t) hereinafter), as $f(t)=R(t)e^{i\varphi(t)}$. The imaginary part of the complex auxiliary function $f(t)$, denoted as $\Im(f(t))$, corresponds to the pulse function $g^{(-)}(t)$. From a comparison of the imaginary part of the complex auxiliary function $f(t)$, $\Im(f(t))=R(t)\sin[\varphi(t)]$ and the definition of the pulse function $g^{(-)}(t)=\Omega(t)\sin[\psi(t)]$, the amplitude function Ω(t) can be analytically computed as $$\Omega(t) = R(t) = |f(t)| = \pm\sqrt{G^2(t)+g^2(t)}.$$

There are two branches of the amplitude function Ω(t), corresponding to a positive envelope function of the pulse function $g^{(-)}(t)$ and a negative envelope function of the pulse function $g^{(-)}(t)$. If there are no simultaneous zeros of the pulse function $g^{(-)}(t)$ and the auxiliary function G(t), no crossings of the positive and negative branches of the amplitude function Ω(t) occur. That is, the positive branch of the amplitude function Ω(t) is continuous over the gate duration τ (0≤t≤τ). The negative branch of the amplitude function Ω(t) is also continuous over the gate duration τ (0≤t≤τ).

The phase function ψ(t) varies in the range [−∞, ∞] and thus the argument φ(t) of the complex auxiliary function $f(t)$ is computed such that the resulting phase function ψ(t) is continuous over the gate duration τ (0≤t≤τ). Using the branch of the arccos function that satisfies $$0 \le \arccos(\xi) \le \pi,\ \xi \in [1,-1],$$

and the function Arg[z] defined as $$\mathrm{Arg}[z] = \begin{cases} \arccos\left(\frac{x}{r}\right), & \text{if } y \ge 0 \\ 2\pi - \arccos\left(\frac{x}{r}\right), & \text{if } y < 0, \end{cases}$$

the phase function ψ(t) can also be analytically computed as $$\psi(t)=\varphi(t)=\arg(f(t))=\mathrm{Arg}[f(t)]+2\pi N(t),$$

where $r=\sqrt{x^2+y^2}$ is defined for a complex number z=x+iy, and the function N(t) is a step function of t that is an integer determined such that the resulting phase function ψ(t) is continuous over the gate duration τ (0≤t≤τ).

The detuning frequency function μ(t) can also be analytically computed using the analytically computed phase function $\psi(t)=\psi_0+\int_0^t \mu(t')\,dt'$ and the analytically computed amplitude function Ω(t) as $$\mu(t) = \psi'(t) = \frac{[G'(t)+ig^{(-)'}(t)]e^{-i\psi(t)} - \Omega'(t)}{i\Omega(t)},$$

where ψ'(t), Ω'(t), and $g^{(-)'}(t)$ are time-derivatives of the phase function ψ(t), the amplitude function Ω(t), and the pulse function $g^{(-)}(t)$, respectively. It should be noted that the amplitude function Ω(t) and the phase function OM that are computed analytically in the embodiments herein are continuous functions that do not have any abrupt changes in value in the time domain.

Phase Smoothing

The detuning frequency function μ(t) as analytically computed may exhibit sharp excursions in frequency (referred to as "spikes"), which makes implementation of a pulse having such a detuning frequency function μ(t) impossible in speed- and bandwidth-limited hardware, such as the system 100. In a practical implementation, the detuning frequency function μ(t) is spline interpolated, for example, using polynomial interpolation. However, since the analytically computed detuning frequency function μ(t) may exhibit singularities in the time-domain, spline interpolating of the detuning frequency function μ(t) may cause large interpolation errors and yield low fidelity in gate operations performed using a pulse having the spline interpolated detuning frequency function μ(t).

Thus, in the embodiments described herein, the analytically computed phase function ψ(t) is smoothed over a certain time interval to $\bar{\psi}(t)$. The smoothed detuning frequency function $\bar{\psi}(t)$ is then computed as the time-derivative of the smoothed phase function $\bar{\psi}(t)$, and then the smoothed detuning frequency function $\bar{\mu}(t)$ is spline interpolated. The inventors have found that such smoothing of the analytically computed phase function ψ(t) may yield high fidelity in gate operations performed using a pulse having the smoothed detuning frequency function $\bar{\mu}(t)$ computed using the smoothed phase function $\bar{\psi}(t)$. While not intending to be bound by theory, it is believed the smoothed detuning frequency function $\bar{\mu}(t)$ includes fewer and milder singularities than the analytically computed detuning frequency function μ(t). The smoothed phase function $\bar{\psi}(t)$ at a time t may be a weighted average of the analytically computed phase function ψ(t) over a time interval Δ, that is $$\bar{\psi}(t) = \mathcal{N} \int_{-\frac{\Delta}{2}}^{\frac{\Delta}{2}} w(t')\psi(t+t')\,dt',$$

where w(t') is a positive semi-definite weight function, defined as w(t')>0 for $$-\frac{\Delta}{2} < t' < \frac{\Delta}{2}$$

and zero otherwise $$\left(\text{i.e.}, t' \le -\frac{\Delta}{2}, \frac{\Delta}{2} \le t'\right),$$

and $\mathcal{N}$ is a normalization factor, defined as $$\mathcal{N} = \left[\int_{-\frac{\Delta}{2}}^{\frac{\Delta}{2}} w(t') dt'\right]^{-1}.$$

In some embodiments, the weight function w(t') is defined as $$w(t') = \begin{cases} \frac{1}{\Delta}, -\frac{\Delta}{2} < t' < \frac{\Delta}{2}, \Delta > 0, \\ 0, t' \le -\frac{\Delta}{2}, \frac{\Delta}{2} \le t' \end{cases}.$$

In some other embodiments, the weight function w(t') is defined as $$w(t') = \begin{cases} \frac{2}{\Delta}\cos^2\left(\frac{\pi t'}{\Delta}\right), -\frac{\Delta}{2} < t' < \frac{\Delta}{2}, \Delta > 0, \\ 0, t' \le -\frac{\Delta}{2}, \frac{\Delta}{2} \le t' \end{cases}.$$

The weight function w(t') may be any other function that has a positive finite value for the time interval $\Delta$.

Once the smoothed detuning frequency function $\bar{\mu}(t)$ is computed using the smoothed phase function $\bar{\psi}(t)$, the smoothed detuning frequency function $\bar{\mu}(t)$ is subsequently spline interpolated to $\tilde{\mu}(t)$ such that a resulting pulse can be practically implemented. In spline interpolating the smoothed detuning frequency function $\bar{\mu}(t)$, for example, a cubic spline is used that is constructed of piecewise third-order polynomial functions which pass through a set of $N_{DS}$ time points $t_l$ during the gate duration $\tau$, where $$t_l = (l-1)\frac{\tau}{N_{DS}} (l = 1, 2, \ldots, N_{DS}).$$

The spline-interpolated detuning frequency function $\tilde{\mu}(t)$ for a lth time segment $t \in [t_l, t_{l+1}]$ may have a set of coefficients $a_l$, $b_l$, $c_l$, and $d_l$ to be determined: $\tilde{\mu}(t) = a_l + b_l(t-t_l) + c_l(t-t_l)^2 + d_l(t-t_l)^3$. The set of coefficients are determined by interpolation using the smoothed detuning frequency function $\bar{\mu}(t)$. In some embodiments, lower order (e.g., second order) or higher order (e.g., fourth order or higher order) polynomial functions are used for the spline interpolation.

It should be noted that the particular example embodiments described above are just some possible examples of a method of construction of pulse functions according to the present disclosure and do not limit the possible configuration, specifications, or the like of methods of construction of pulse functions. For example, the symmetry of the amplitude function $\Omega(t)$ and the detuning frequency function $\mu(t)$ may be selected to be anti-symmetric (having a negative parity), or have mixed symmetry (having a mixed parity), based on convenience related to configurations, specifications, or the like of the system 100. However, imposing a symmetry in the amplitude function $\Omega(t)$ and the detuning frequency function $\mu(t)$ may lead to eliminating errors in external parameters, such as relative offsets in Lamb-Dicke parameters $\eta_{i,p}$ or the pulse function $g^{(-)}(t)$, by an appropriate choice of symmetry of the amplitude function $\Omega(t)$ and the detuning frequency function $\mu(t)$ and/or echo techniques.

EXAMPLES

Figure 7A:
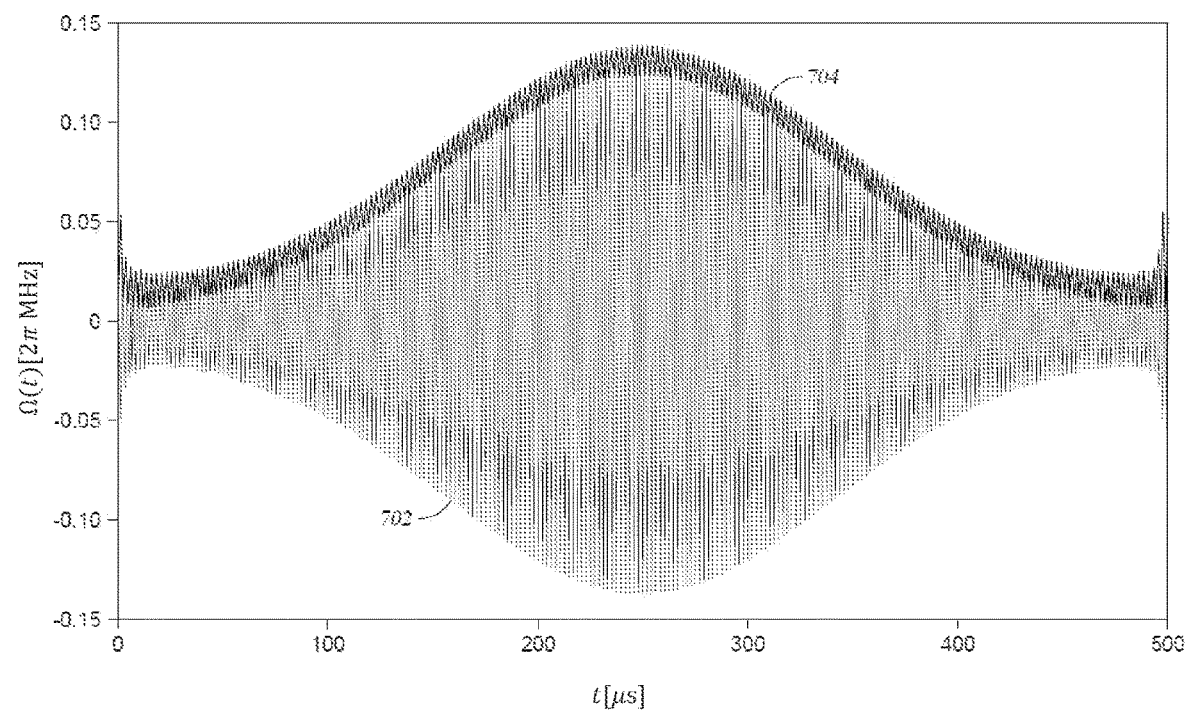
FIGS. 7A, 7B, and 7C illustrate a pulse function of a pulse, an analytically computed amplitude function of the pulse, and a spline interpolation of the analytically computed amplitude function according to one embodiment.
Figure 7B:
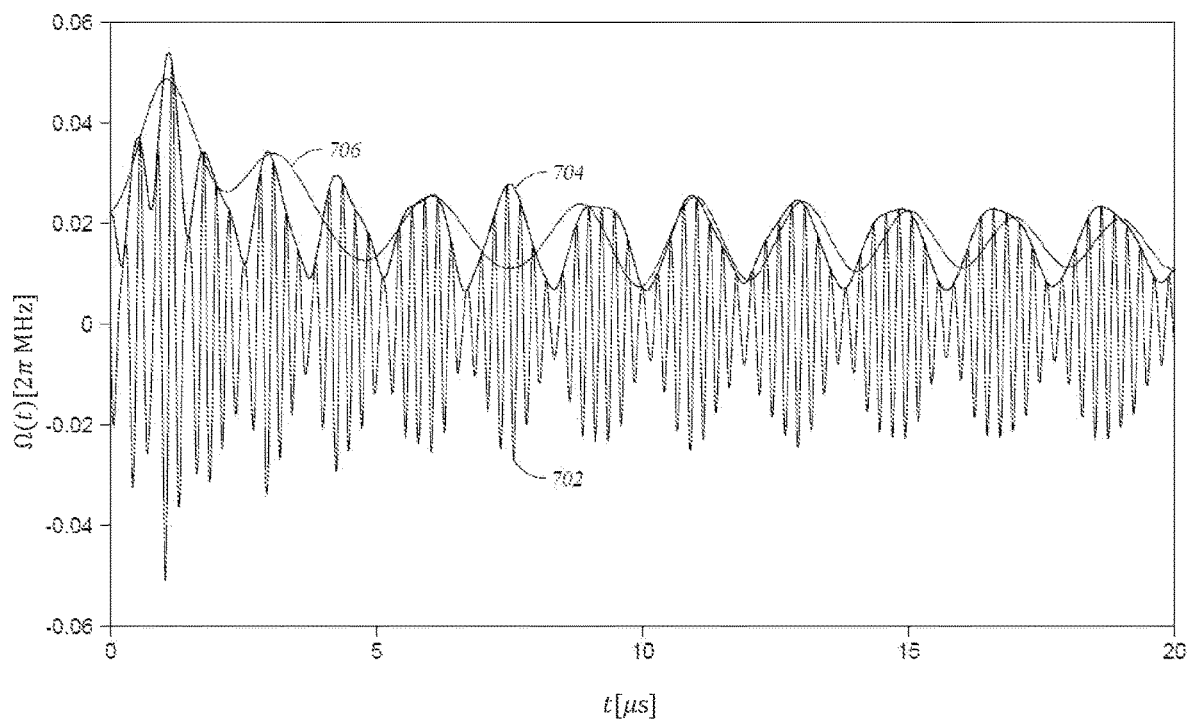
Figure 7C:
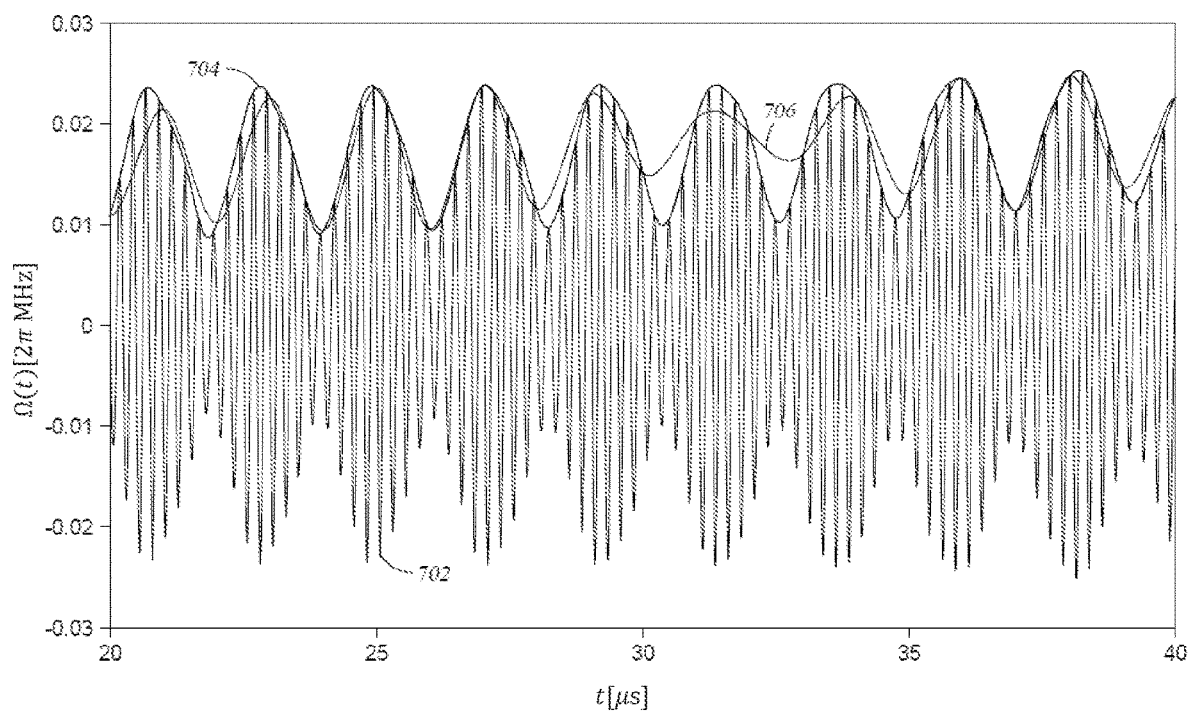

The following presents examples of a pulse to deliver to a pair of trapped ions in the chain 102 of 43 trapped ions of which the middle 33 trapped ions are used for performing an XX-gate operation between the pair of trapped ions. FIGS. 7A, 7B, and 7C illustrate the pulse function $g^{(-)}(t)$ 702 of a pulse, the analytically computed amplitude function $\Omega(t)$ 704 of the pulse, and a spline interpolation 706 of the analytically computed amplitude function $\Omega(t)$ 704. Piecewise polynomial functions which pass through a set of 500 time points ($N_{DS}$=500) are used in the spline interpolation. The duration of a time segment ($t \in [t_l, t_{l+1}]$) in the spline interpolation is lower-bounded by the speed- and bandwidth-limited hardware, such as the system 100, to several hundred nanoseconds. The pulse is power-optimal and the gate duration $\tau$ is 500 $\mu s$. The condition for stabilization includes K-th order stabilization (K=5) with respect to a drift $\Delta \omega_p$ in the frequencies $\omega_p$ of the motional modes.

In Example 1, an analytically computed detuning frequency function $\mu(t)$ of the pulse is spline interpolated. In Example 2, the analytically computed detuning frequency function $\mu(t)$ of the pulse is smoothed and then spline interpolated.

Example 1

Figure 8A:
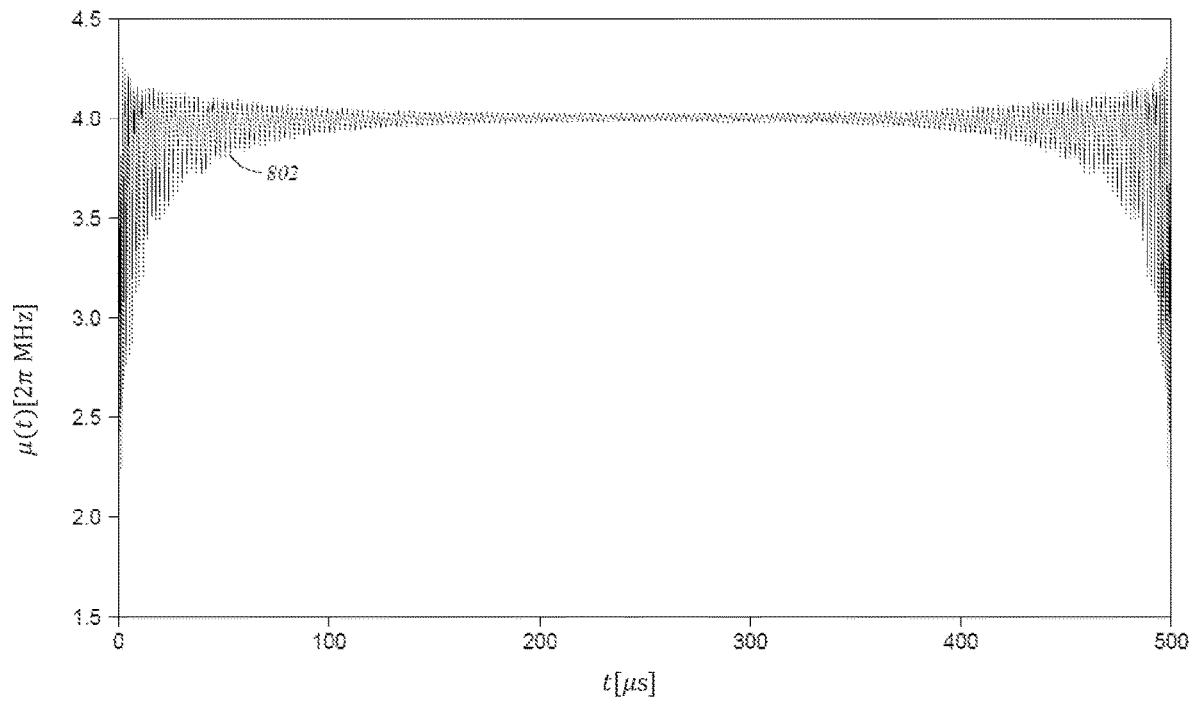
FIGS. 8A, 8B, and 8C illustrate an analytically computed detuning frequency function of a pulse and a spline interpolation of the analytically computed detuning frequency function according to one embodiment.
Figure 8B:
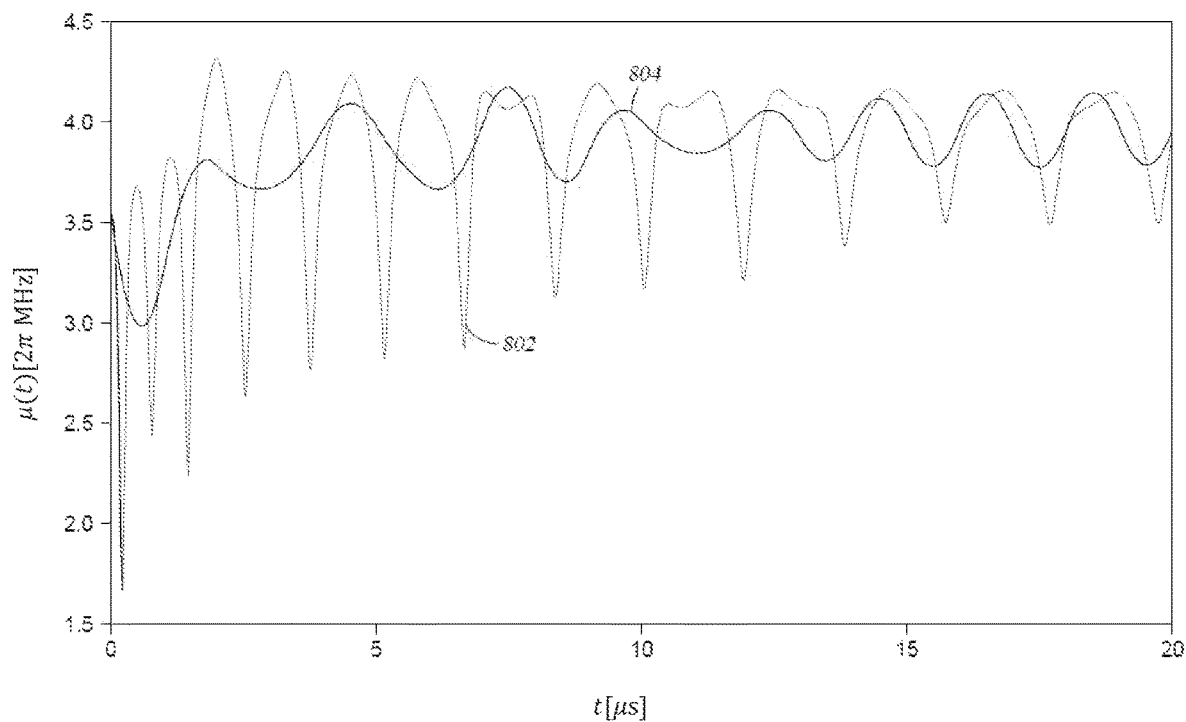
Figure 8C:
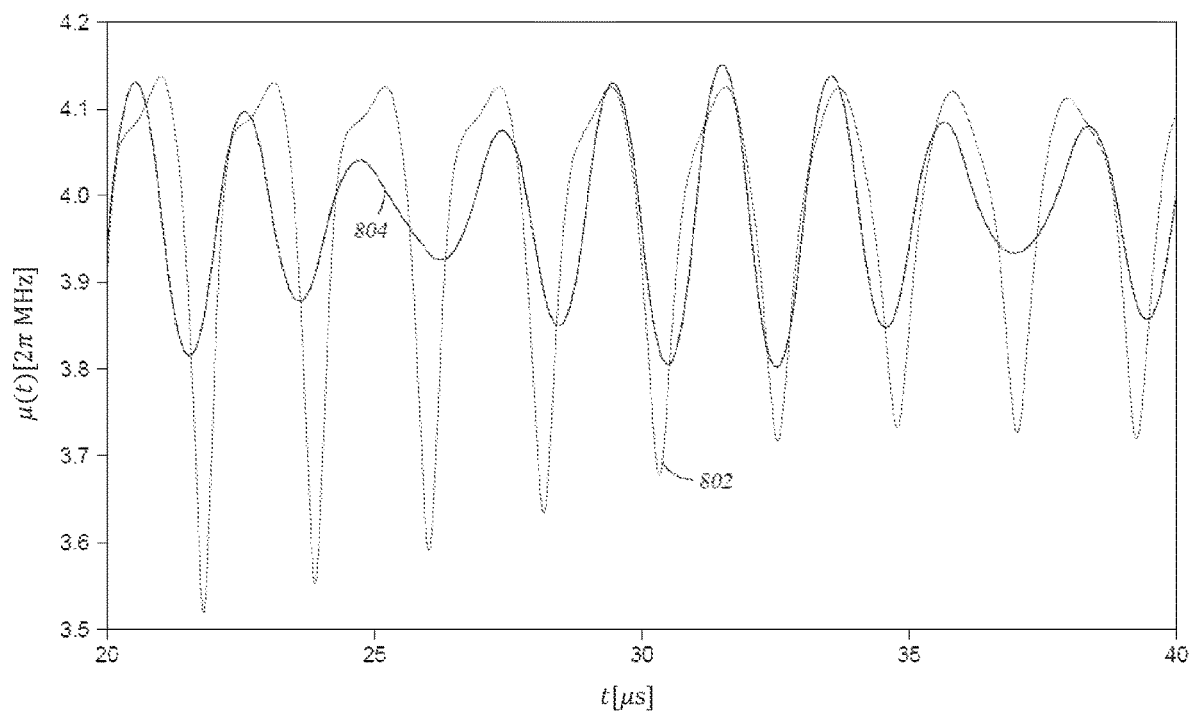

FIGS. 8A, 8B, and 8C illustrate an analytically computed detuning frequency function $\mu(t)$ 802 of a pulse and a spline interpolation 804 of the analytically computed detuning frequency function $\mu(t)$ 802. Piecewise polynomial functions which pass through a set of 500 time points ($N_{DS}$=500) are used in the spline interpolation.

It should be noted that the spline interpolation 804 of the analytically computed detuning frequency function $\mu(t)$ 802 does not capture structures in the time domain of the analytically computed detuning frequency function $\mu(t)$ 802. This deviation of a spline-interpolated pulse having the spline interpolation 804 (that is to be implemented) from the pulse having the analytically computed detuning frequency function $\mu(t)$ 802 potentially leads to reduction in the fidelity of an XX gate operation in practice. Infidelity of an XX gate operation performed by a pulse having the spline interpolation 706 of the analytically computed amplitude function $\Omega(t)$ 704 and the spline interpolation 804 of the analytically computed detuning frequency function $\mu(t)$ 802 is about $0.15 \times 10^{-3}$.

Example 2

Figure 9A:
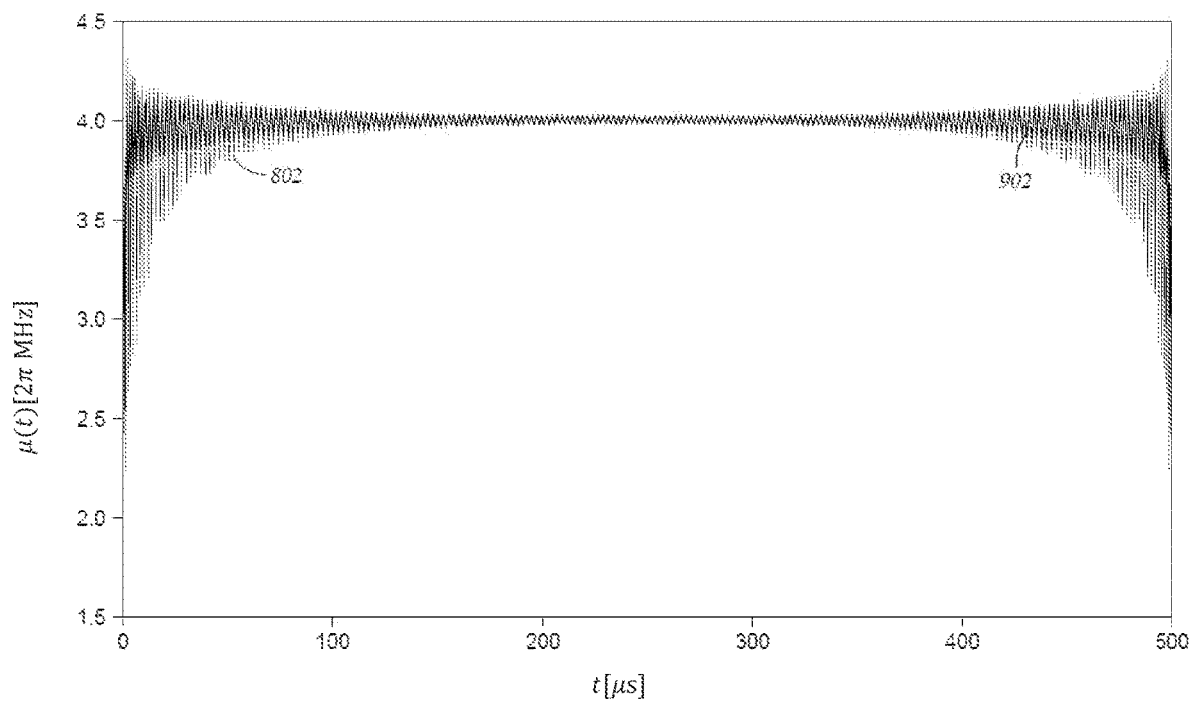
FIGS. 9A, 9B, and 9C illustrate an analytically computed detuning frequency function of a pulse, a smoothed detuning frequency function of the pulse, and a spline interpolation of the smoothed detuning frequency function according to one embodiment.
Figure 9B:
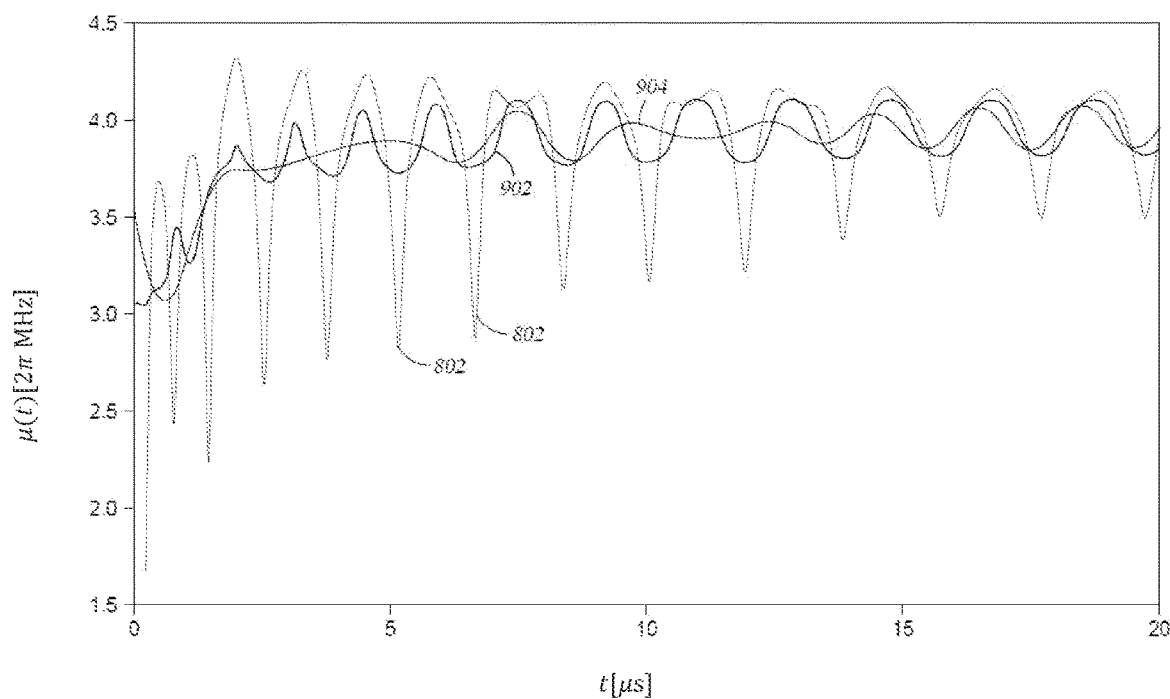
Figure 9C:
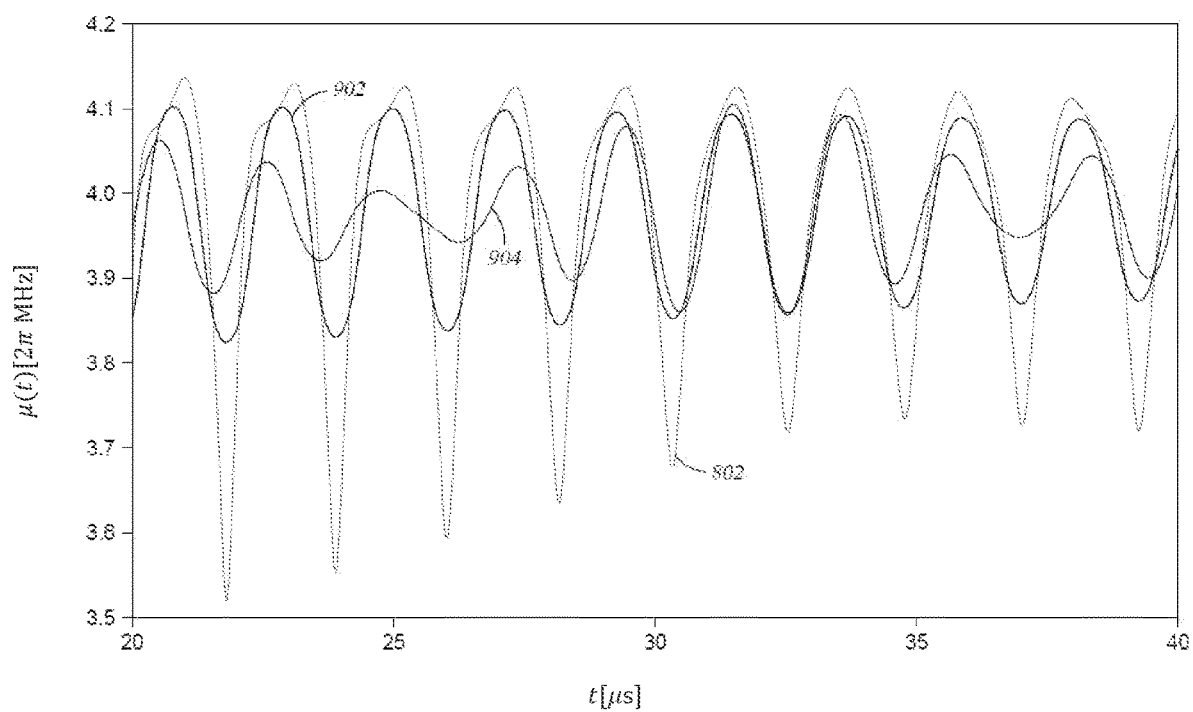

FIGS. 9A, 9B, and 9C illustrate the analytically computed detuning frequency function $\mu(t)$ 802 shown in FIGS. 8A, 8B, and 8C, the smoothed detuning frequency function $\bar{\mu}(t)$ 902, and the spline interpolation 904 of the smoothed detuning frequency function $\bar{\mu}(t)$ 902. The smoothed detuning frequency function $\bar{\mu}(t)$ 902 is derived as the time derivative of the smoothed accumulated phase function $\bar{\psi}(t)$. The analytically computed phase function OM is smoothed over a time interval $\Delta$=1 $\mu s$. Piecewise polynomial functions which pass through a set of 500 time points ($N_{DS}$=500) are used in the spline interpolation. It should be noted that the spline interpolation 904 of the smoothed detuning frequency function $\bar{\mu}(t)$ 902 shown in FIGS. 9A, 9B, and 9C is closer to the analytically computed frequency function $\mu(t)$ 802 than the spline interpolation 804 of the analytically computed detuning frequency function $\mu(t)$ 802 shown in FIGS. 8A, 8B, and 8C. Due to this reduced deviation of the spline interpolation 904 of the smoothed detuning frequency function $\bar{\mu}(t)$ 902 and the analytically computed frequency function $\mu(t)$ 802, infidelity of an XX gate operation performed by a pulse having the spline interpolation 706 of the analytically computed amplitude function $\Omega(t)$ 704 and the spline interpolation 904 of the smoothed detuning frequency function $\bar{\mu}(t)$ 902 is reduced to about $0.37 \times 10^{-4}$.

As described above, in generating a pulse to perform an entangling gate operation between two qubits, control parameters (the detuning frequency function and the amplitude function of the pulse) are determined such that the condition for closure of phase space trajectories, the condition for stabilization, the condition for non-zero interaction, and the condition for minimized power are satisfied. The resulting pulse may be fast varying in time and thus is spline interpolated such that the pulse can practically be implemented in speed- and bandwidth-limited hardware. In the embodiments described herein, the resulting pulse is smoothed over a certain time interval prior to the spline interpolation, leading to a higher fidelity of entangling gate operations performed by the pulse.

Additionally, determining the control parameters includes solving a set of linear equations. Furthermore, an amplitude and a detuning frequency function of a pulse can be analytically computed from the determined control parameters. Thus, determining the control parameters and subsequently constructing a pulse can be performed in an efficient manner to perform a desired XX-gate operation. The XX-gate operations are performed for other pairs of ions using different pulses to run a desired quantum algorithm on a quantum register. At the end of running the desired quantum algorithm, the population of the qubit states (trapped ions) within the quantum register is measured (read-out), so that the results of the quantum computation(s) with the desired quantum algorithm can be determined and provided to the classical computer for use to obtain solutions to problems that may be intractable by the classical computer.

While the foregoing is directed to specific embodiments, other and further embodiments may be devised without departing from the basic scope thereof, and the scope thereof is determined by the claims that follow.

The invention claimed is:

1. A method of performing a computation using a quantum computer, comprising:
   computing a phase function and an amplitude function of a laser pulse to cause entangling interaction between a pair of trapped ions of a plurality of trapped ions, each of the plurality of trapped ions having two frequency-separated states defining a qubit;
   smoothing the computed phase function of the laser pulse;
   computing a detuning frequency function of the laser pulse based on the smoothed phase function of the laser pulse;
   spline interpolating the computed detuning frequency function of the laser pulse; and
   applying a pulse having the spline interpolated detuning frequency function and the amplitude function to the pair of trapped ions.

2. The method according to claim 1, wherein the smoothing of the computed phase function of the laser pulse comprises computing a weighted average of the computed phase function of the laser pulse over a time interval.

3. The method according to claim 1, wherein the computing of the detuning frequency function of the laser pulse comprises computing the time-derivative of the smoothed phase function.

4. The method according to claim 1, wherein the computing of the phase function and the amplitude function of the laser pulse is based on the condition for returning of trapped ions to their original positions and momentum values and the condition for non-zero entangling interaction.

5. The method according to claim 4, wherein the computing of the phase function and the amplitude function of the laser pulse is further based on the condition for stabilization.

6. The method according to claim 4, wherein the computing of the phase function and the amplitude function of the laser pulse is further based on the condition for minimized power.

7. A non-transitory computer-readable medium including computer program instructions, which when executed by a processor, cause the processor to:
   compute a phase function and an amplitude function of a laser pulse to cause entangling interaction between a pair of trapped ions of a plurality of trapped ions, each of the plurality of trapped ions having two frequency-separated states defining a qubit;
   smooth the computed phase function of the laser pulse;
   compute a detuning frequency function of the laser pulse based on the smoothed phase function of the laser pulse;
   spline interpolate the computed detuning frequency function of the laser pulse; and
   apply a laser pulse having the spline interpolated detuning frequency function and the amplitude function to the pair of trapped ions.

8. The non-transitory computer-readable medium according to claim 7, wherein the smoothing of the computed phase function of the laser pulse comprises computing a weighted average of the computed phase function of the laser pulse over a time interval.

9. The non-transitory computer-readable medium according to claim 7, wherein the computing of the detuning frequency function of the laser pulse comprises computing the time-derivative of the smoothed phase function.

10. The non-transitory computer-readable medium according to claim 7, wherein the computing of the phase function and the amplitude function of the laser pulse is based on the condition for returning of trapped ions to their original positions and momentum values and the condition for non-zero entangling interaction.

11. The non-transitory computer-readable medium according to claim 10, wherein the computing of the phase function and the amplitude function of the laser pulse is further based on the condition for stabilization.

12. The non-transitory computer-readable medium according to claim 10, wherein the computing of the phase function and the amplitude function of the laser pulse is further based on the condition for minimized power.

13. A quantum computing system, comprising:
   a plurality of trapped ions, each of the trapped ions having two hyperfine states defining a qubit; and
   a controller comprising non-volatile memory having a number of instructions stored therein which, when executed by a processor, causes the quantum computing system to perform operations comprising:

computing a phase function and an amplitude function of a laser pulse to cause entangling interaction between a pair of trapped ions of the plurality of trapped ions;

smoothing the computed phase function of the laser pulse;

computing a detuning frequency function of the laser pulse based on the smoothed phase function of the laser pulse;

spline interpolating the computed detuning frequency function of the laser pulse; and applying a laser pulse having the spline interpolated detuning frequency function and the amplitude function to the pair of trapped ions.

14. The quantum computing system according to claim 13, wherein
each of the trapped ions is an ion having a nuclear spin and an electron spin such that a difference between the nuclear spin and the electron spin is zero.

15. The quantum computing system according to claim 14, wherein
each of the trapped ions is an ion having a nuclear spin ½ and the $^2S_{1/2}$ hyperfine states.

16. The quantum computing system according to claim 13, wherein the smoothing of the computed phase function of the laser pulse comprises computing a weighted average of the computed phase function of the laser pulse over a time interval.

17. The quantum computing system according to claim 13, wherein the computing of the phase function of the laser pulse comprises computing the time-derivative of the smoothed phase function.

18. The quantum computing system according to claim 13, wherein the computing of the phase function and the amplitude function of the laser pulse is based on the condition for returning of trapped ions to their original positions and momentum values and the condition for non-zero entangling interaction.

19. The quantum computing system according to claim 18, wherein the computing of the detuning frequency function and the amplitude function of the laser pulse is further based on the condition for stabilization.

20. The quantum computing system according to claim 18, wherein the computing of the detuning frequency function and the amplitude function of the laser pulse is further based on the condition for minimized power.

* * * * *